(12) United States Patent
Hafenrichter et al.

(10) Patent No.: US 11,079,760 B2
(45) Date of Patent: Aug. 3, 2021

(54) METHODS FOR MAINTAINING DIFFICULT-TO-ACCESS STRUCTURES USING UNMANNED AERIAL VEHICLES

(71) Applicant: The Boeing Company, Chicago, IL (US)

(72) Inventors: Joseph L. Hafenrichter, Auburn, WA (US); Gary E. Georgeson, Tacoma, WA (US)

(73) Assignee: The Boeing Company, Chicago, IL (US)

(*) Notice: Subject to any disclaimer, the term of this patent is extended or adjusted under 35 U.S.C. 154(b) by 261 days.

(21) Appl. No.: 16/202,347

(22) Filed: Nov. 28, 2018

(65) Prior Publication Data

US 2020/0166938 A1    May 28, 2020

(51) Int. Cl.
*G05D 1/00*    (2006.01)
*F03D 17/00*   (2016.01)
(Continued)

(52) U.S. Cl.
CPC .......... *G05D 1/0094* (2013.01); *B64C 27/20* (2013.01); *B64C 27/37* (2013.01); *B64C 39/024* (2013.01); *F03D 17/00* (2016.05); *G05D 1/0202* (2013.01); *G05D 1/101* (2013.01); *B64C 2201/126* (2013.01); *F05B 2260/80* (2013.01); *G01M 5/0016* (2013.01); *G01M 5/0033* (2013.01);
(Continued)

(58) Field of Classification Search
CPC ...... F03D 80/50; F03D 17/00; G01M 5/0016; G01M 5/0033; G01M 5/0066; G01M 5/0083; G01M 5/0091; B64C 39/024; B64C 2201/027; B64C 2201/042; B64C 2201/108; B64C 2201/12; B64C 2201/126; B64C 2201/146; B64C 27/20; B64C 27/37; Y02E 10/72; F05B 2260/80; G05D 1/0094; G05D 1/0202; G05D 1/101
USPC ........................................................... 701/3
See application file for complete search history.

(56) References Cited

U.S. PATENT DOCUMENTS 4,413,905 A    11/1983  Holzapfel
5,135,356 A     8/1992  Shepherd
(Continued)

FOREIGN PATENT DOCUMENTS

CA    2979925 A1 *  4/2018  .......... G01M 5/0008
CN    106124517 A *  11/2016
(Continued)

OTHER PUBLICATIONS

Nikolic et al., "A UAV System for Inspection of Industrial Facilities," Aerospace Conference, 2013 IEEE, Mar. 2-9, 2013.

*Primary Examiner* — Atul Trivedi
(74) *Attorney, Agent, or Firm* — Ostrager Chong Flaherty & Broitman P.C.

(57) ABSTRACT

Methods for performing maintenance operations using unmanned aerial vehicles (UAVs). The methods are enabled by equipping a UAV with a maintenance tool capable of performing a desired maintenance operation (e.g., nondestructive inspection) on a limited-access surface of a large structure or object (e.g., a wind turbine blade). The UAV uses re-orientation of lifting means (e.g., vertical rotors) to move the maintenance tool continuously or intermittently across the surface of the structure while maintaining contact with the surface of the structure undergoing maintenance.

21 Claims, 18 Drawing Sheets

(51) Int. Cl.
*G05D 1/10* (2006.01)
*B64C 39/02* (2006.01)
*B64C 27/20* (2006.01)
*B64C 27/37* (2006.01)
*G05D 1/02* (2020.01)
*G01M 5/00* (2006.01)

(52) U.S. Cl.
CPC ........ *G01M 5/0066* (2013.01); *G01M 5/0083* (2013.01); *G01M 5/0091* (2013.01)

(56) References Cited

U.S. PATENT DOCUMENTS

| | | | |
|---|---|---|---|
| 7,643,893 | B2 | 1/2010 | Troy et al. |
| 7,813,888 | B2 | 10/2010 | Vian et al. |
| 7,859,655 | B2 | 12/2010 | Troy et al. |
| 8,044,991 | B2 | 10/2011 | Lea et al. |
| 8,060,270 | B2 | 11/2011 | Vian et al. |
| 8,214,098 | B2 | 7/2012 | Murray et al. |
| 8,738,226 | B2 | 5/2014 | Troy et al. |
| 8,744,133 | B1 | 6/2014 | Troy et al. |
| 8,874,283 | B1 * | 10/2014 | Cavote ................... F22B 21/00 701/2 |
| 9,156,321 | B2 | 10/2015 | Troy et al. |
| 9,221,506 | B1 | 12/2015 | Georgeson et al. |
| 9,371,133 | B2 | 6/2016 | Mays |
| 9,513,635 | B1 | 12/2016 | Bethke et al. |
| 9,731,818 | B2 | 8/2017 | Dekel et al. |
| 9,840,339 | B1 | 12/2017 | O'Brien et al. |
| 10,053,236 | B1 * | 8/2018 | Buchmueller .......... G01N 29/04 |
| 2010/0063650 | A1 * | 3/2010 | Vian ........................ B64F 5/60 701/2 |
| 2010/0268409 | A1 * | 10/2010 | Vian ...................... G05D 1/104 701/24 |
| 2013/0206921 | A1 * | 8/2013 | Paduano ................. B64C 13/16 244/7 C |
| 2016/0264223 | A1 * | 9/2016 | Ferguson ............... B63G 8/001 |
| 2016/0320775 | A1 * | 11/2016 | Priest ................... G05D 1/0094 |
| 2016/0323751 | A1 * | 11/2016 | Priest ................... H04W 16/18 |
| 2017/0134963 | A1 * | 5/2017 | Priest ................... G05D 1/0094 |
| 2018/0086455 | A1 * | 3/2018 | Burch, V ............... G06Q 50/28 |
| 2018/0101169 | A1 * | 4/2018 | Applewhite .......... G08G 5/0069 |
| 2018/0120196 | A1 * | 5/2018 | Georgeson ............... B64D 1/02 |
| 2018/0149138 | A1 * | 5/2018 | Thiercelin ............... F03D 80/50 |
| 2018/0170414 | A1 * | 6/2018 | Arndt .................... B61L 27/0094 |
| 2018/0273173 | A1 * | 9/2018 | Moura .................... G01N 25/72 |
| 2018/0319497 | A1 * | 11/2018 | Priest ..................... B60L 53/80 |
| 2020/0363822 | A1 * | 11/2020 | Georgeson ............ B64C 39/024 |

FOREIGN PATENT DOCUMENTS

| | | | | |
|---|---|---|---|---|
| CN | 108408082 | A | * | 8/2018 |
| GB | 2552092 | A | * | 1/2018 ........... B64C 39/024 |
| GB | 2561950 | A | * | 10/2018 ............ G08G 5/045 |
| KR | 101879673 | B1 | * | 7/2018 |
| WO | WO-2009142933 | A2 | * | 11/2009 ............. G05D 1/104 |
| WO | WO-2011016857 | A2 | * | 2/2011 ............. B62D 57/024 |
| WO | WO-2015067941 | A1 | * | 5/2015 ............. B63G 8/001 |

\* cited by examiner

METHODS FOR MAINTAINING DIFFICULT-TO-ACCESS STRUCTURES USING UNMANNED AERIAL VEHICLES

BACKGROUND

This disclosure generally relates to automated systems for carrying maintenance tools across limited-access surfaces of large structures, such maintenance tools including (but not limited to) sensors used in nondestructive inspection (NDI). In particular, this disclosure relates to apparatus for performing automated maintenance operations on airfoil-shaped bodies, such as wind turbine blades and rotors.

As used herein, the term "maintenance" includes, but is not limited to, operations such as NDI, target or decal attachment, surface treatment, drilling, damage marking, placement of materials, coating removal, cleaning, sanding and painting. For the sake of illustration, the bulk of the following disclosure will focus on nondestructive inspection of limited-access areas on large structures. However, it should be appreciated that at least some of the concepts disclosed below have application when performing other types of maintenance.

In-person human-based inspections of large structures and various types of large objects can be time consuming, expensive and difficult for an individual to perform. Examples of large structures that pose significant inspection challenges include such as wind turbine blades, aircraft fuselages, storage tanks, bridges, dams, levees, power plants, power lines or electrical power grids, water treatment facilities; oil refineries, chemical processing plants, high-rise buildings, and infrastructure associated with electric trains and monorail support structures.

Nondestructive inspection of structures involves thoroughly examining a structure without harming the structure or requiring significant disassembly of the structure. Nondestructive inspection is advantageous for many applications in which a thorough inspection of the exterior and/or interior of a structure is required. Various types of sensors may be utilized to perform NDI. One or more sensors may scan the structure to be examined, acquiring NDI sensor data from the structure from which internal anomalies can be identified. The data acquired by the sensors is typically processed by a processing element, and the processed data may be presented to a user via a display.

With current approaches for automated NDI of large or difficult-to-access structure, an NDI scanner (e.g., a self-propelled crawler vehicle equipped with an NDI sensor unit) may drive across the surface to be inspected. But such drive motion is achieved via friction, which requires sufficient normal forces to enable shear forces between the wheels of the scanner and the structure being inspected (or wheels and a track). Lifting carts with cables holding the NDI scanner may be placed on and moved along a surface of the structure to be inspected, but this approach can be complicated, costly, and time-consuming to set up and run. Portability and packaging all necessary systems onto the structure can be a challenging issue as well, if that structure is far off the ground, like a wind turbine blade.

Utilizing an unmanned aerial vehicle (UAV), an operator can safely acquire images of structures without being placed in harm's way and without requiring cumbersome and expensive equipment, such as cranes or platforms. A typical UAV, however, does not have the ability to provide any NDI beyond visual imaging because the typical UAV is not designed to place an NDI sensor unit in contact with or in proximity to a surface of the structure being inspected and then scan the NDI sensor unit across that surface. It would be desirable to provide an improved method for using a UAV to place a maintenance tool (such as an NDI sensor unit) in contact with or in proximity to a limited-access area of a large structure or object.

SUMMARY

The subject matter disclosed in some detail below is directed to methods for performing maintenance operations using unmanned aerial vehicles (UAVs). The methods are enabled by equipping a UAV with a maintenance tool capable of performing a desired maintenance operation (e.g., nondestructive inspection) on a limited-access surface of a large structure or object (e.g., a wind turbine blade) while the UAV is hovering adjacent to and in contact with that surface. (As used herein, the term "hover" should be construed broadly to include each of the following scenarios: (a) the vertical rotors are rotating, the UAV is not in contact with any structure and the UAV is not moving; or (b) the vertical rotors are rotating, the UAV is in contact with a structure and the UAV is not moving.) In a particular embodiment, the UAV uses re-orientation of lifting means (e.g., vertical rotors) to move the maintenance tool continuously or intermittently across the surface of the structure while maintaining contact with the surface of the structure undergoing maintenance. Such flight of a UAV while in contact with a surface will be referred to herein as "skimming".

The UAVs disclosed herein include a controller which preferably takes the form of a plurality of rotor motor controllers that communicate with an onboard computer system configured to coordinate the respective rotations of the rotors. The controller is configured (e.g., programmed) to control the rotors to cause the UAV to fly along a flight path to a first location whereat a plurality of standoff contact elements (e.g., ball rollers, wheels or low-friction sliding surfaces) of the UAV contact the surface of the structure being maintained (e.g., inspected). Once the standoff contact elements are in contact with the surface of the structure, the controller controls the rotors to produce a net thrust that maintains the UAV stationary at the first location with the standoff contact elements in contact with the surface of the structure. Then the maintenance tool is activated to perform a maintenance operation on the surface. Thereafter one or more rotors may be reoriented to produce a net thrust that causes the UAV to skim from the first location to a second location while the remaining rotors ensure flight and sufficient pressure against the surface for smooth scanning during skimming. The maintenance tool may be activated to perform another maintenance operation while the UAV hovers at the second location with the standoff contact elements in contact with the surface of the structure or the maintenance operation may be performed continuously or intermittently as the UAV skims from the first location to the second location. During skimming, the position of the UAV may be determined by encoders, or for higher fidelity, encoders supplemented with an off-board positioning method, such as tracking using a local positioning system or motion capture using cameras. Once the scanning has been completed, the UAV lifts offs from the surface, again using reorientation and speed changes on a subset of the rotors.

The tool-equipped UAVs disclosed herein do not rely on traction on the surface like the traditional crawling robot, so the UAV may traverse dirty or wet surfaces without slippage or danger of falling. Scanning can be done at a low cost relative to many other approaches, and still be automated and rapid. The tool-equipped UAV is light in weight and does not require that a complicated support system be placed on the structure.

In accordance with some embodiments, the UAV is equipped with an NDI sensor unit for enabling full UAV-based scanning inspection of structures and eliminating on-structure drive approaches for NDI. The UAV is configured to place the NDI sensor unit in contact with or in proximity to a surface of a structure being inspected and then scanning the NDI sensor unit across that surface while maintaining contact or proximity.

In cases where the maintenance operation is NDI, NDI sensor data is collected during the scanning while being simultaneously tied to (correlated with) the measured position, and stored in a non-transitory tangible computer-readable storage medium onboard the UAV or transferred wirelessly to a separate computer on the ground. Multiple maintenance tool-equipped UAVs may be used at the same time, as long as their relative positions are checked and controlled to avoid collision.

In a particular application of the method for UAV-based NDI, the NDI sensor unit may be scanned across a surface of a limited-access airfoil-shaped body such as a wind turbine blade. As used herein, the term "airfoil-shaped body" means an elongated body having two surfaces connecting a leading edge having a curved (e.g., rounded) profile to a sharp (e.g., angled) trailing edge. The method and UAV proposed herein enables rapid, large-area NDI of wind turbine blades, which capability may provide manifold benefits to the wind generation industry. The technology disclosed in some detail below provides a simplified and potentially lower cost solution for scanning a sensor or sensor array across the surfaces of a wind turbine blade (or other structure or object) to collect sensor data representing characteristics of the structure inspected.

Although various embodiments of methods for performing a maintenance operation in a limited-access area of a large structure using unmanned aerial vehicles are described in some detail later herein, one or more of those embodiments may be characterized by one or more of the following aspects.

One aspect of the subject matter disclosed in detail below is an unmanned aerial vehicle comprising: a frame comprising a plurality of standoff support members and a plurality of tool support members; a maintenance tool supported by the plurality of tool support members; a plurality of rotor motors coupled to the frame; a plurality of rotors coupled to respective rotor motors of the plurality of rotor motors; a plurality of motor controllers for controlling operation of the respective rotor motors of the plurality of rotor motors; a plurality of standoff contact elements coupled to distal ends of respective standoff support members of the plurality of standoff support members; and a maintenance tool supported by the plurality of tool support members in a fixed position relative to the plurality of standoff contact elements.

Another aspect of the subject matter disclosed in detail below is a method for performing a maintenance operation using an unmanned aerial vehicle, comprising: (a) the unmanned aerial vehicle flies to a first location whereat a plurality of standoff contact elements of the unmanned aerial vehicle contact respective areas on a surface of the structure; (b) the unmanned aerial vehicle hovers at the first location with the standoff contact elements in contact with the surface of the structure; and (c) a maintenance tool on-board the unmanned aerial vehicle performs a first maintenance operation while the unmanned aerial vehicle is hovering at the first location with the standoff contact elements in contact with the surface of the structure.

In accordance with some embodiments of the method described in the immediately preceding paragraph, the method further comprises: (d) the unmanned aerial vehicle moves from the first location to a second location whereat the plurality of standoff contact elements of the unmanned aerial vehicle contact respective areas of the surface of the structure; (e) the unmanned aerial vehicle hovers at the second location with the standoff contact elements in contact with the surface of the structure; and (f) the maintenance tool performs a second maintenance operation while the unmanned aerial vehicle is hovering at the second location with the standoff contact elements in contact with the surface of the structure.

In accordance with other embodiments, the method further comprises: (d) the unmanned aerial vehicle moves away from the first location while maintaining the plurality of standoff contact elements in contact with the surface of the structure; and (e) the maintenance tool performs a second maintenance operation during movement of the unmanned aerial vehicle away from the first location.

A further aspect of the subject matter disclosed in detail below is a method for performing a maintenance operation on an airfoil-shaped body using an unmanned aerial vehicle, the method comprising: (a) equipping the unmanned aerial vehicle with a maintenance tool and a plurality of standoff contact elements, the plurality of standoff contact elements being arranged to simultaneously contact a surface of the airfoil-shaped body, and the maintenance tool being arranged to confront an area on the surface of the airfoil-shaped body while the plurality of standoff contact elements are in contact with the surface; (b) flying the unmanned aerial vehicle to a first location whereat the plurality of standoff contact elements of the unmanned aerial vehicle contact respective areas on a surface of the airfoil-shaped body; and (c) while the unmanned aerial vehicle is at the first location with the plurality of standoff contact elements in contact with the surface of the airfoil-shaped body, activating the maintenance tool to perform a first maintenance operation on the surface of the airfoil-shaped body.

In accordance with some embodiments of the method described in the immediately preceding paragraph, the method further comprises: (d) upon completion of step (c), flying the unmanned aerial vehicle to a second location while maintaining the plurality of standoff contact elements of the unmanned aerial vehicle in contact with the surface of the airfoil-shaped body; and (e) while the unmanned aerial vehicle is at the second location with the plurality of standoff contact elements in contact with the surface of the airfoil-shaped body, activating the maintenance tool to perform a second maintenance operation on the surface of the airfoil-shaped body.

In accordance with other embodiments, the method further comprises: (d) upon completion of step (c), flying the unmanned aerial vehicle away from the first location while maintaining the plurality of standoff contact elements in contact with the surface of the airfoil-shaped body; and (e) while the unmanned aerial vehicle is flying away from the first location with the plurality of standoff contact elements in contact with the surface of the airfoil-shaped body, activating the maintenance tool to perform a second maintenance operation on the surface of the airfoil-shaped body.

In accordance with one proposed implementation of the method for performing a maintenance operation on an airfoil-shaped body, the maintenance tool is a sensor array, step (d) comprises moving the sensor array along a scan path that follows the surface of the airfoil-shaped body, and step (e) comprises activating the sensor array to acquire nondestructive inspection sensor data representing characteristics of the airfoil-shaped body during movement of the sensor array along the scan path. For example, such method is especially useful for inspecting a wind turbine blade.

Other aspects of methods for performing a maintenance operation in a limited-access area using an unmanned aerial vehicle are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, methods for performing a maintenance operation on a limited-access surface of a structure or object using a UAV will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In accordance with the embodiments disclosed in some detail below, the UAV takes the form of a rotorcraft having at least three rotors. In accordance with the implementation disclosed herein, each rotor has two mutually diametrally opposed rotor blades. However, in alternative implementations, UAVs having rotors with more than two rotor blades may be used. As used herein, the term "rotor" refers to a rotating device that includes a rotor mast, a rotor hub mounted to one end of the rotor mast, and two or more rotor blades extending radially outward from the rotor hub. In the embodiments disclosed herein, the rotor mast is mechanically coupled to an output shaft of a drive motor, referred to hereinafter as a "rotor motor". The rotor motor drives rotation of the rotor. As used herein, the term "rotor system" means a combination of components, including at least a plurality of rotors and a controller configured to control rate of rotor rotation to generate sufficient aerodynamic lift force to support the weight of the UAV and sufficient thrust to counteract aerodynamic drag in forward flight.

Figure 1:
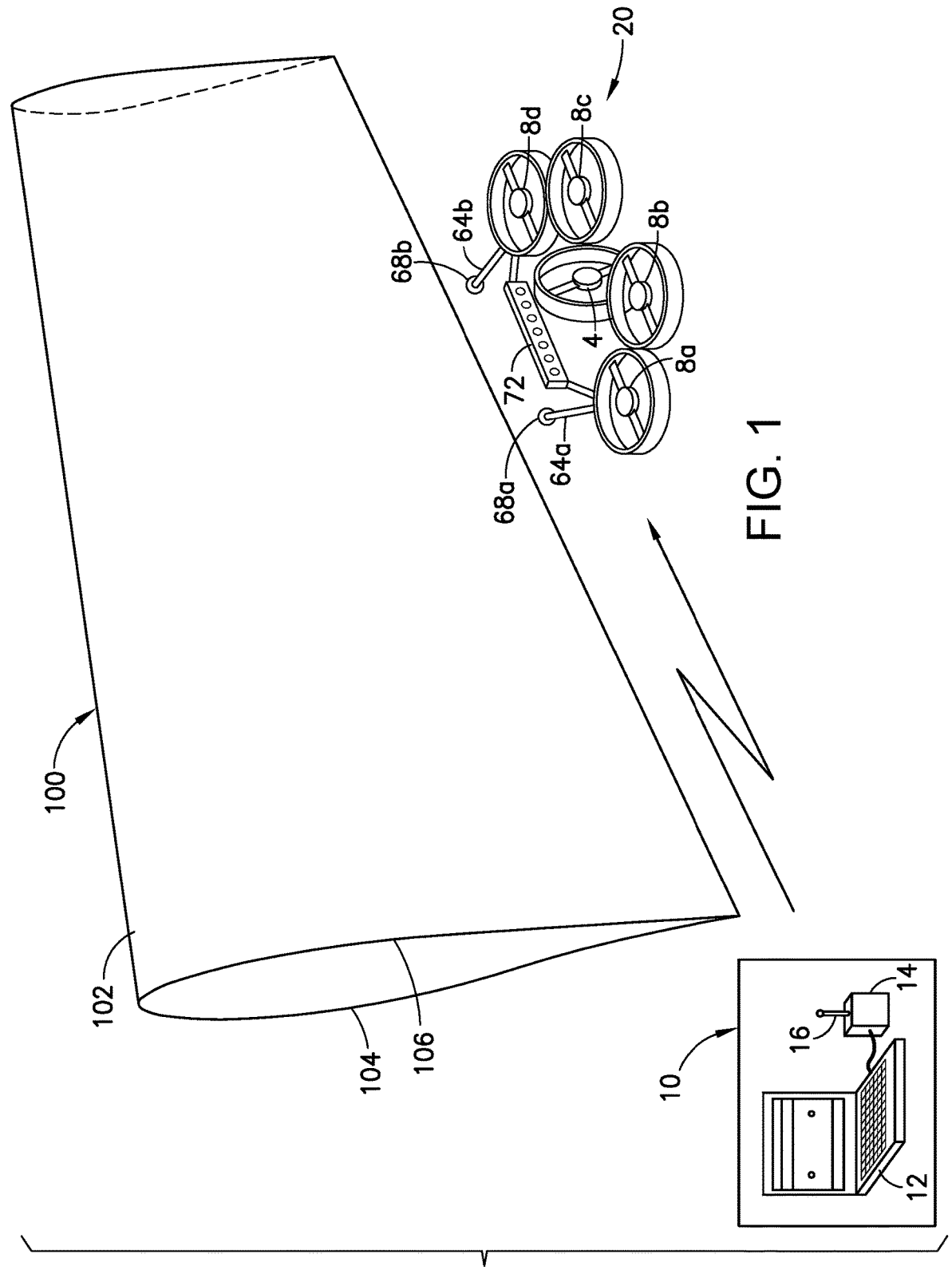
FIG. 1 is a diagram showing a system for inspecting an airfoil-shaped body using an airborne UAV.

FIG. 1 is a diagram showing a system for performing a maintenance operation on an airfoil-shaped body 100 using an unmanned aerial vehicle 20 (hereinafter "UAV 20"). FIG. 1 shows the UAV 20 during flight. In the scenario depicted, the UAV 20 is a rotorcraft comprising four vertical rotors 8a-8d and one normal rotor 4. As used herein, the term "vertical rotor" means a rotor having an axis of rotation that is vertical when the UAV 20 is level (e.g., the pitch, yaw and roll angles each equal zero degrees). As used herein, the term "normal rotor" means a rotor having an axis of rotation that is normal to a vertical plane intersecting the axis of rotation of the vertical rotor defined in the immediately preceding sentence. 10. In accordance with one proposed implementation, the plurality of rotors comprise first through fourth rotors (e.g., vertical rotors 8a-8d) having axes of rotation which are parallel and a fifth rotor (e.g., normal rotor 4) having an axis of rotation perpendicular to the axes of rotation of the first through fourth rotors.

The UAV 20 depicted in FIG. 1 may be equipped to perform a maintenance function. For the purpose of illustration, the UAV 20 is shown in FIG. 1 equipped with a sensor array 72 for use in NDI. As will be described in more detail below, the frame of the UAV 20 includes a standoff system (only standoff support members 64a and 64b and standoff contact elements 68a and 68b of the standoff system are shown in FIG. 1) for maintaining the sensor array 72 in a standoff position relative to the surface being inspected. Various embodiments of such a sensor array-equipped UAV will be described in some detail below with reference to FIGS. 2-5.

Although the structure being inspected is illustrated as an airfoil-shaped body 100 having two side surfaces 104 and 106 connected by a leading edge 102, the system is equally well adapted for use in inspecting a wide range of other structures including, but not limited to, power lines, power-generating facilities, power grids, dams, levees, stadiums, large buildings, bridges, large antennas and telescopes, water treatment facilities, oil refineries, chemical processing plants, high-rise buildings, and infrastructure associated with electric trains and monorail support structures. The system is also particularly well suited for use inside large buildings such as manufacturing facilities and warehouses.

Virtually any structure that would be difficult, costly, or too hazardous to inspect by a human controlling the inspection device or the platform carrying the inspection device may potentially be inspected using the system depicted in FIG. 1.

For inspection applications, a rotorcraft is preferred due to its ability to hover and move at very slow speeds. The vertical take-off and landing capability of remote-controlled unmanned rotorcraft also may be highly advantageous in many applications, especially when operating inside of structures or facilities such as manufacturing plants, warehouses, etc., or when inspecting complex facilities such as oil refineries or chemical processing that may have many tall structures (e.g., smoke stacks) clustered closely together. The ability to hover and/or move only vertically enables remote-controlled unmanned rotorcraft to fly close to and inspect large vertical structures such as vertical support posts of bridges, antennas or vertical surfaces of dams.

The system depicted in FIG. 1 further comprises a remote control station 10 for sending and receiving wireless communications to and from the UAV 20. In accordance with one embodiment, the remote control station 10 comprises a laptop computer 12, a transceiver 14 and an antenna 16. The transceiver 14 is in communication with the antenna 16 for enabling communication between the laptop computer 12 and the UAV 20.

The on-board system of the UAV 20 may further comprise a guidance and control hardware and software system (not shown in FIG. 1) that is able to implement one or more different, stored flight plans digitally represented by flight plan data stored in a non-transitory tangible computer-readable storage medium (not shown in FIG. 1). The on-board system may further comprise a global positioning system/inertial navigation system (GPS/INS) for controlling the orientation of UAV 20 and assisting in carrying out the preprogrammed flight plan stored in memory. A wireless transceiver and an on-board antenna (not shown in FIG. 1) enable bidirectional, wireless electromagnetic wave communications with the remote control station 10.

Figure 2:
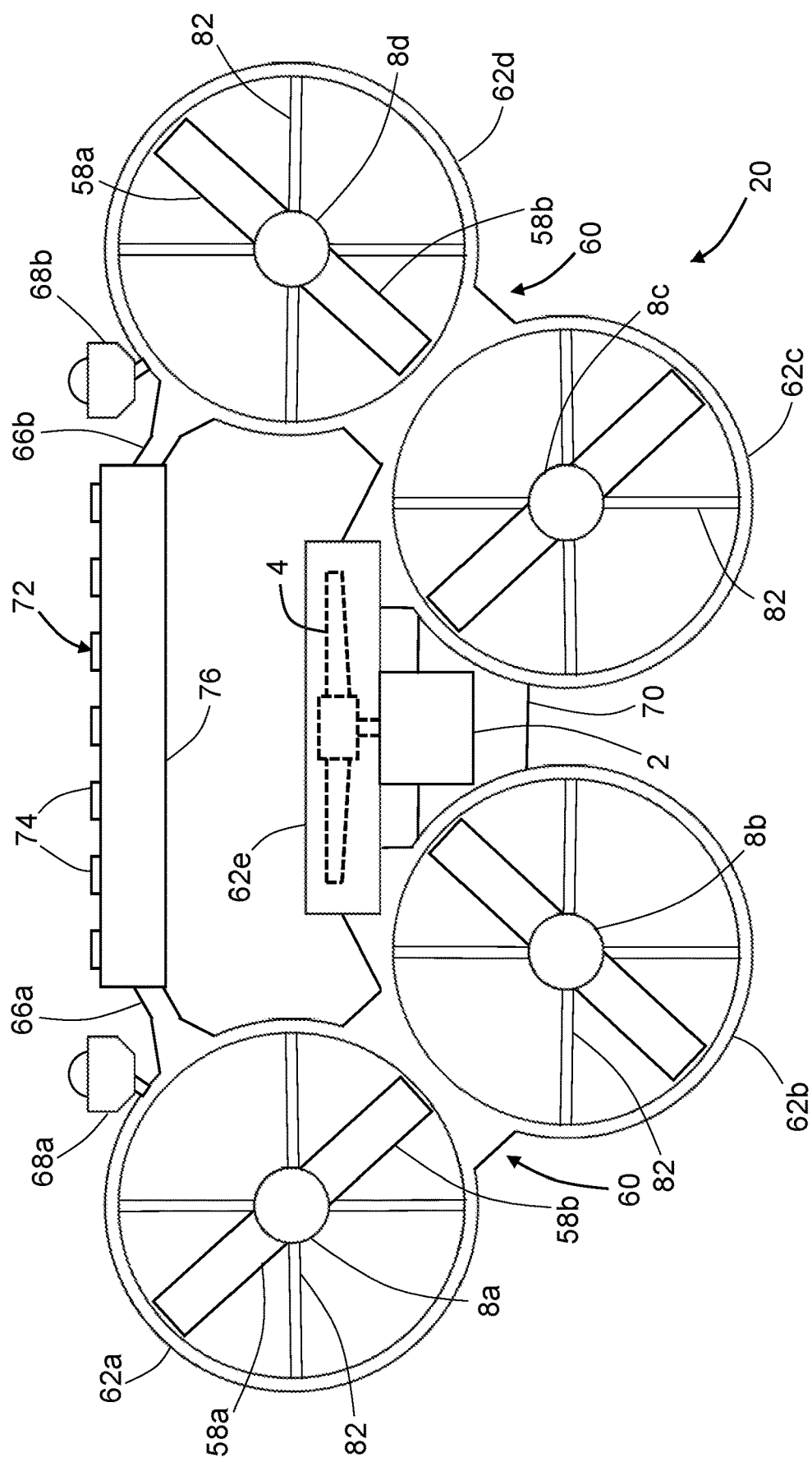
FIG. 2 is a diagram representing a top view of a UAV equipped with a sensor array in accordance with one embodiment.
Figure 3:
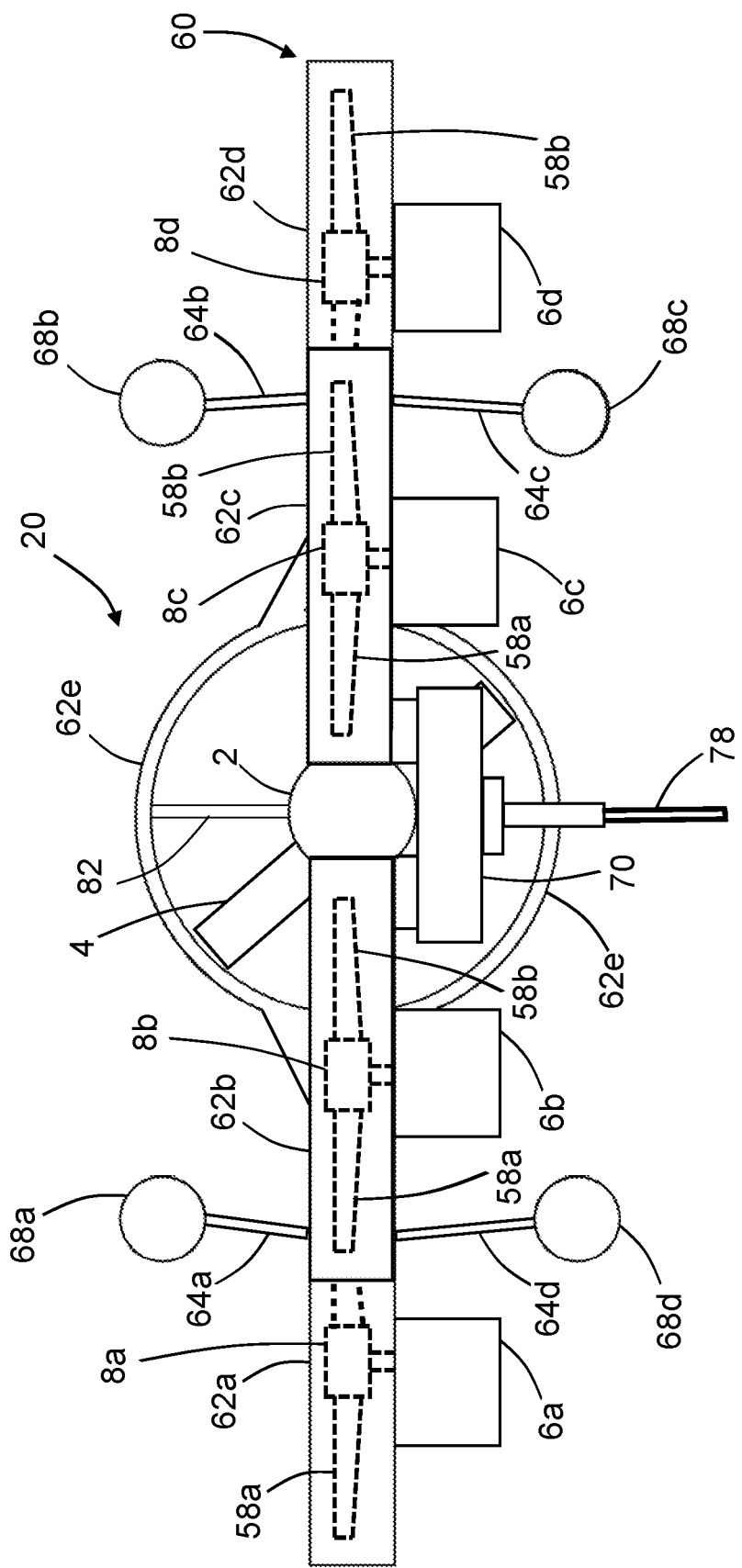
FIGS. 3 and 4 are diagrams representing rear and side views respectively of the UAV depicted in FIG. 2.
Figure 4:
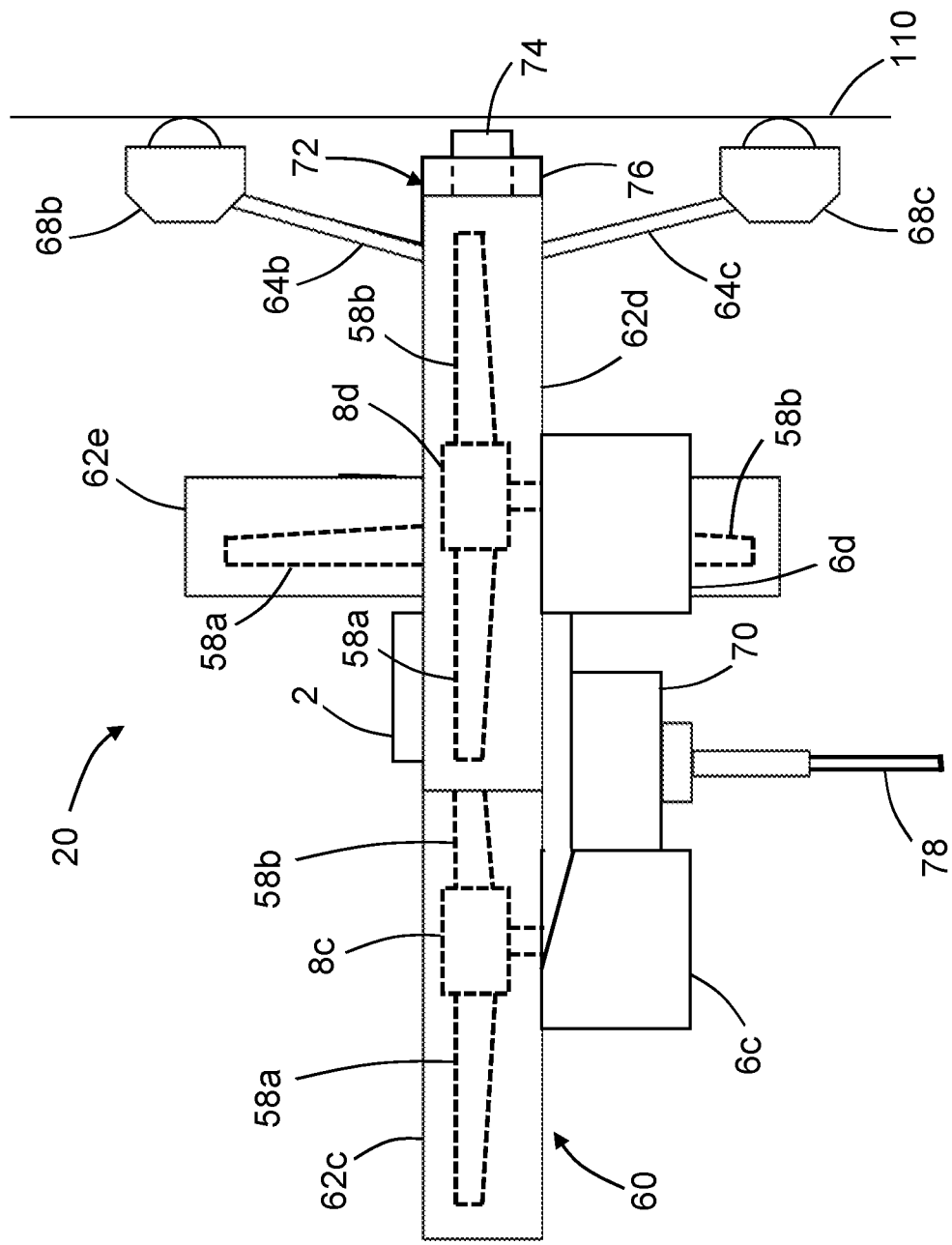
Figure 5:
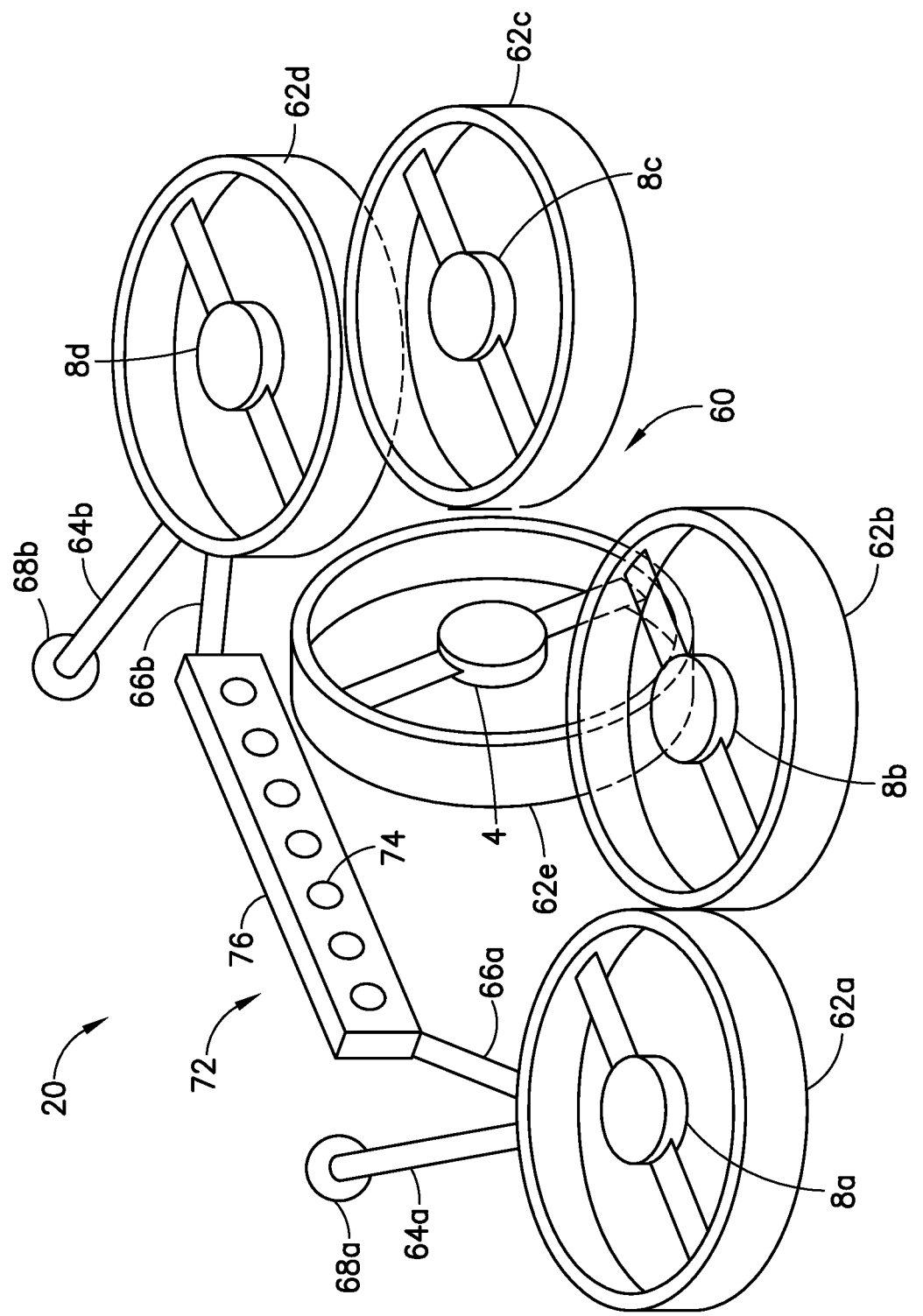
FIG. 5 is a diagram representing a three-dimensional view of the frame of the UAV depicted in FIGS. 2-4.

FIG. 2 is a diagram representing a top view of a UAV 20 equipped with a sensor array 72 in accordance with one embodiment. FIGS. 3 and 4 show rear and side views respectively of the UAV 20 depicted in FIG. 2. FIG. 5 is a three-dimensional view of the frame 60 of the UAV 20 depicted in FIGS. 2-4. In alternative embodiments, the UAV 20 may be equipped with a maintenance tool other than a sensor array.

In addition to the sensor array 72, the UAV 20 depicted in FIGS. 2-5 includes a rotor system consisting of rotors, rotor motors and a controller 70. In the depicted example, each rotor has two rotor blades 58a and 58b. However, each rotor may have more than two rotor blades. As best seen in FIG. 2, the UAV 20 includes four vertical rotors 8a-8d and four vertical rotor motors 6a-6d which respectively drive rotation of vertical rotors 8a-8d. As best seen in FIG. 3, the UAV 20 further includes a normal rotor 4 and a normal rotor motor 2 which drives rotation of the normal rotor 4. The UAV 20 depicted in FIGS. 2-5 further includes a frame 60 designed to support the aforementioned rotors, motors, controller and sensor array. Frame 60 may comprise integrally formed sections or fastened or joined parts. The frame components named hereinafter may be integrally formed or separately assembled regardless of any implication in the component name that the component is a separate (not integral) part.

As best seen in FIG. 2, frame 60 includes four vertical rotor deflector rings 62a-62d and a normal rotor deflector ring 62e having fixed positions relative to each other. The rotor masts of vertical rotors 8a-8d are rotatable inside bearings (not shown in the drawings), which bearings are supported by radial struts 82 which connect to the vertical rotor deflector rings 62a-62d respectively. The vertical rotor motors 6a-6d (see FIG. 3) are also mechanically coupled to the vertical rotor deflector rings 62a-62d respectively by means of radial struts 82. Likewise the rotor mast of normal rotor 4 is rotatable inside a bearing (not shown in the drawings) supported by radial struts 82 (only one of which is visible in FIG. 3) which connect to the normal rotor deflector ring 62e. The normal rotor motor 2 is also mechanically coupled to the normal rotor deflector ring 62e by means of radial struts 82. Each rotor motor may be mechanically coupled to the outer ring of a respective bearing, with a respective rotor mast mechanically coupled to the output shaft of a respective rotor motor and mechanically coupled to the inner ring of the respective bearing.

As best seen in FIG. 3, the frame 60 further includes four standoff support members 64a-64d which extend from the rotor deflector rings in the manner of cantilever beams. Four standoff contact elements 68a-68d are coupled to distal ends of respective standoff support members 64a-64d. In alternative embodiments, three or more standoff support members and standoff contact elements may be employed. Regardless of the number of standoff contact elements, the standoff contact elements are preferably positioned relative to each other and relative to the sensor array 72 such that the sensor array 72 is in a stable position and nearly parallel to the confronting portion of the surface to be inspected when the standoff contact elements are all in contact with the surface.

In the example embodiment depicted in FIGS. 2-5, the standoff contact elements 68a-68d are respective ball rollers (a.k.a. ball-and-socket bearings). In one alternative embodiment, the standoff contact elements 68a-68d are wheels having mutually parallel axes of rotation. In another alternative embodiment, the standoff contact elements 68a-68d are pivotably coupled sliding blocks capable of adjusting their angular position to lie flat on a non-planar surface when the standoff contact elements 68a-68d are placed in contact with that non-planar surface. The sliding blocks have low-friction surfaces suitable for sliding along a surface of a structure. Preferably the frame 60 of UAV 20 is configured so that the standoff contact elements 68a-68d may all contact a surface (e.g., a planar surface) at the same time. More specifically, the UAV 20 may be flown to a location adjacent the surface of a structure scheduled to undergo a maintenance operation, whereat the standoff contact elements 68a-68d all contact the surface of the structure (as seen in FIG. 12B, described in more detail below).

As best seen in FIG. 5, the frame 60 further includes a sensor support plank 76 and two tool support members 66a and 66b which support opposite ends of the sensor support plank 76. The sensor support plank 76 supports a sensor array 72 that includes a plurality of sensors 74 (e.g., ultrasonic transducers or eddy current probes). One end of the sensor support plank 76 is connected or attached to tool support member 66a and the other end of the sensor support plank 76 is connected or attached to tool support member 66b. The plurality of sensors 74 may be arranged in one or more rows, the sensors in each row being arranged with equal spacing between adjacent sensors. For example, the sensor support plank 76 may be formed with openings in which the sensors 74 are respectively installed.

The tool support members 66a and 66b and standoff support members 64a-64d of frame 60 are configured such that the sensor array 72 (or other maintenance tool) is supported by the plurality of tool support members in a fixed position relative to the plurality of standoff contact elements 68a-68d. Thus when the standoff contact elements 68a-68d all contact a surface of a structure, the sensor array 72 will have a specified position with respect to the confronting area of the surface. Depending on the type of sensor being used, the frame 60 may be designed such that the sensors 74 of the sensor array 72 will be in contact with or at a standoff distance from the surface being contacted by standoff contact elements 68a-68d. In the case wherein the sensor array 72 is separated from the confronting surface by a standoff distance, the sensors 74 are preferably separated from the surface by equal standoff distances. FIG. 4 shows a scenario in which standoff contact elements 68a-68d are in contact with a surface 110 while the sensors 74 of the sensor array 72 are separated from the surface 110 by a standoff distance.

As best seen in FIGS. 3 and 4, the UAV 20 in accordance with one embodiment further includes a controller 70. The controller 70 controls the operation of the normal rotor motor 2 and vertical rotor motors 8a-8d. The controller 70 receives electrical power from a power source on the ground via an electrical cable 78. The electrical cable 78 may optionally also include wires for conducting electrical control signals from a ground station to the controller 70 and conducting electrical sensor data signals from an onboard NDI sensor unit to the ground station.

More specifically, the controller 70 may include respective motor controllers (a.k.a. electronic speed control circuits) for controlling the rotational speeds of the rotor motors. In one embodiment shown in FIG. 6, the controller 70 includes a computer system 44 and a plurality of motor controllers 46. In one proposed implementation, the computer system 44 is configured with various software modules, including a software module that controls UAV flight and a software module that controls an NDI sensor unit 34. (The sensor array 72 shown in FIGS. 2-5 is a component of the NDI sensor unit 34 shown in FIG. 6.) The computer system 44 sends information to the motor controllers 46 for controlling the revolutions per minute and direction of each rotor motor. The UAV 20 may also be equipped with a video camera 30 that operates under the control of the computer system 44. More specifically, the video camera 30 may be activated by the computer system 44 to acquire an image and then send the image data back to the computer system 44 for storage and later transmission to the ground.

Figure 6:
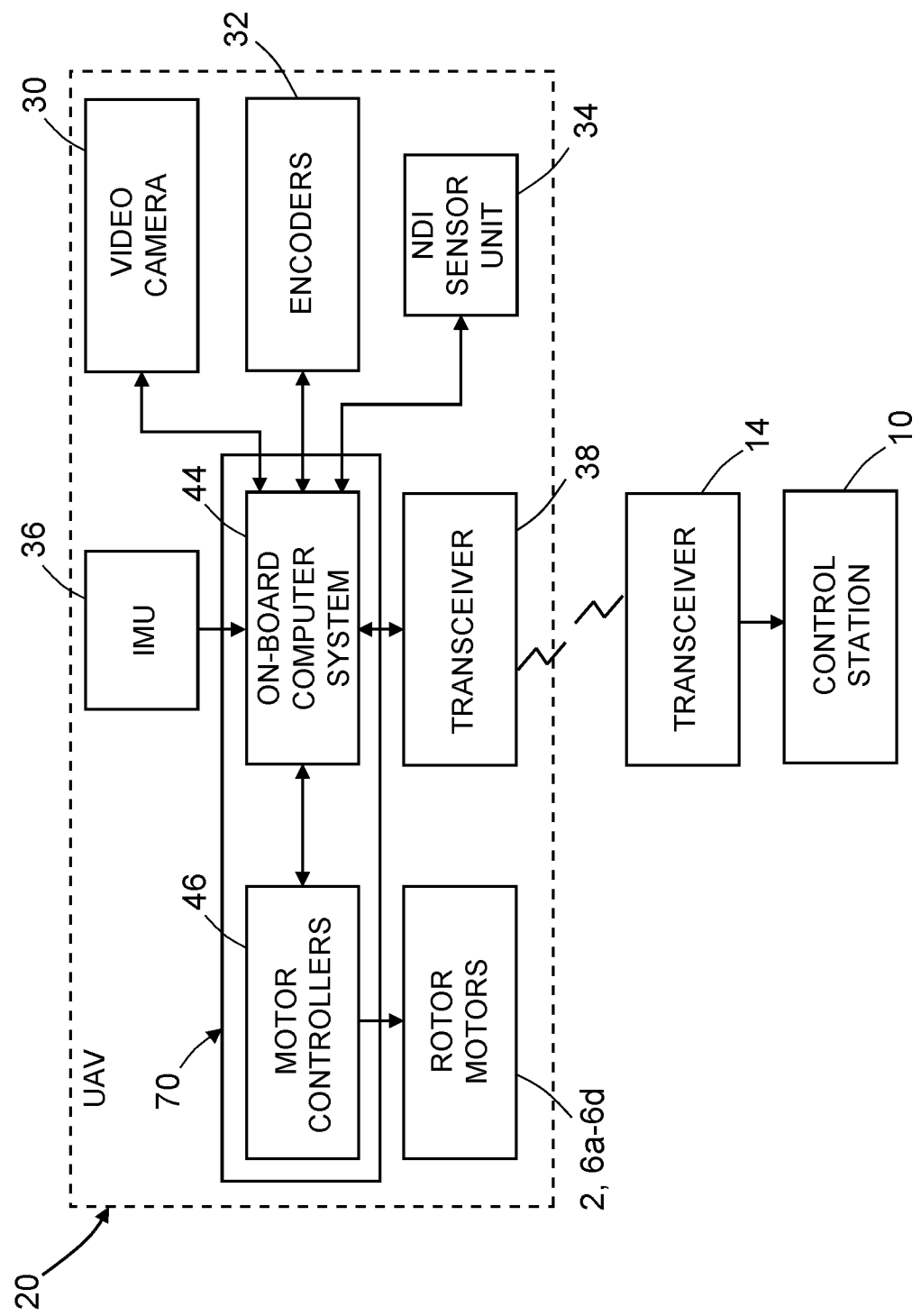
FIG. 6 is a block diagram identifying some components of a system for performing nondestructive inspection of a structure using a remote-controlled UAV in accordance with one embodiment.

In the embodiment partly depicted in FIG. 6, the UAV 20, the video camera 30 and the NDI sensor unit 34 are controlled by the computer system 44 on-board the UAV 20 as a function of radiofrequency commands transmitted by a control station 10. Those radiofrequency commands are transmitted by a transceiver 14 on the ground; received by a transceiver 38 on-board the UAV 20; converted by the transceiver 38 into the proper digital format; and then forwarded to the computer system 44. The control station 10 may comprise a general-purpose computer system configured with programming for controlling operation of the UAV 20 and the NDI sensor unit 34 on-board the UAV 20. For example, the flight of the UAV 20 can be controlled using a joystick, keyboard, mouse, touchpad, or touchscreen of a computer system at the control station 10 or other user interface hardware (e.g., a gamepad or a pendant). In addition, the computer system at the control station 10 is configured with programming for processing data received from the UAV 20 during an inspection operation. In particular, the computer system of the control station 10 may comprise a display processor configured with software for controlling a display monitor (not shown in FIG. 6) to display images acquired by the video camera 30. The optical image field, as sighted by a video camera 30 onboard the UAV 20, can be displayed on the display monitor.

Referring again to FIG. 6, the equipment on-board the UAV 20 further comprises an inertial measurement unit 36 (hereinafter "IMU 36"). An inertial measurement unit works by detecting linear acceleration using one or more accelerometers and rotational rate using one or more gyroscopes. In a typical configuration, an inertial measurement unit comprises one accelerometer and one gyroscope per axis for each of the three vehicle axes: pitch, roll and yaw. The computer system 44 may further comprise a separate processor configured with inertial navigation software that utilizes the raw IMU measurements to calculate attitude, angular rates, linear velocity and position relative to a global reference frame. The data collected from the IMU 36 enables the computer system 44 to track the UAV's position using a method known as dead reckoning.

As previously described, the maintenance tool and video camera on-board the UAV 20 may be activated by control signals (e.g., via electrical cables) generated by the computer system 44. The computer system 44 also controls the flight of the UAV 20 by sending commands to the motor controllers 46 which respectively control the rotation of respective rotor motors 2 and 6a-6d that drive rotation of rotors 4 and 8a-8d respectively.

When the UAV operator manipulates the remote control joysticks, flight control signals are sent to the computer system 44. The computer system 44 then controls the respective speeds of the rotor motors. The computer system 44 also receives information from the IMU 36 and from proximity sensors (not shown) and calculates the location of the UAV 20 using programmed flight parameters and algorithms. The motor controllers 46 may take the form of electronic speed control circuits configured to vary an electric motor's speed, direction and braking. Such electronic speed controllers provide high-frequency, high-resolution three-phase AC power to the motors, which are preferably brushless electric motors.

In order for a UAV 20 with four vertical rotors 8a-8d to rise into the air, a lifting force must be created which exceeds the force of gravity. The faster the rotors spin, the greater the lift and vice versa. The UAV 20 is capable of hovering, ascending or descending in a vertical plane. To hover, the net upward thrust of the four vertical rotors 8a-8d must be exactly equal to the gravitational force being exerted on the UAV 20. The UAV 20 may ascend by increasing the thrust (speed) of the four vertical rotors 8a-8d so that the upward force is greater than the weight of the UAV 20. The UAV 20 may descend by decreasing the rotor thrust (speed) so the net force is downward.

The tool-equipped UAVs disclosed herein are also capable of flying forward, backward, or sideways or rotate while hovering during the performance of a maintenance function. For example, in the case of a UAV having four fixed vertical rotors 8a-8d as shown in FIGS. 2-5, increasing the thrust produced by the rear pair of vertical rotors 8b and 8c causes a hovering UAV 20 to pitch forward and fly forward. Similarly, increasing the thrust produced by the left pair of vertical rotors 8a and 8b causes a hovering UAV 20 to roll to the starboard side and fly laterally rightward.

The maintenance methodology disclosed herein takes advantage of the UAV's mobility to "land" onto a surface of a structure, hover while contacting that surface, and then skim along the surface. Before, during and after skimming of the UAV across the surface, the maintenance tool onboard the UAV is able to scan that surface (e.g., for the purpose of NDI). In accordance with the embodiment depicted in FIGS.

Figure 7:
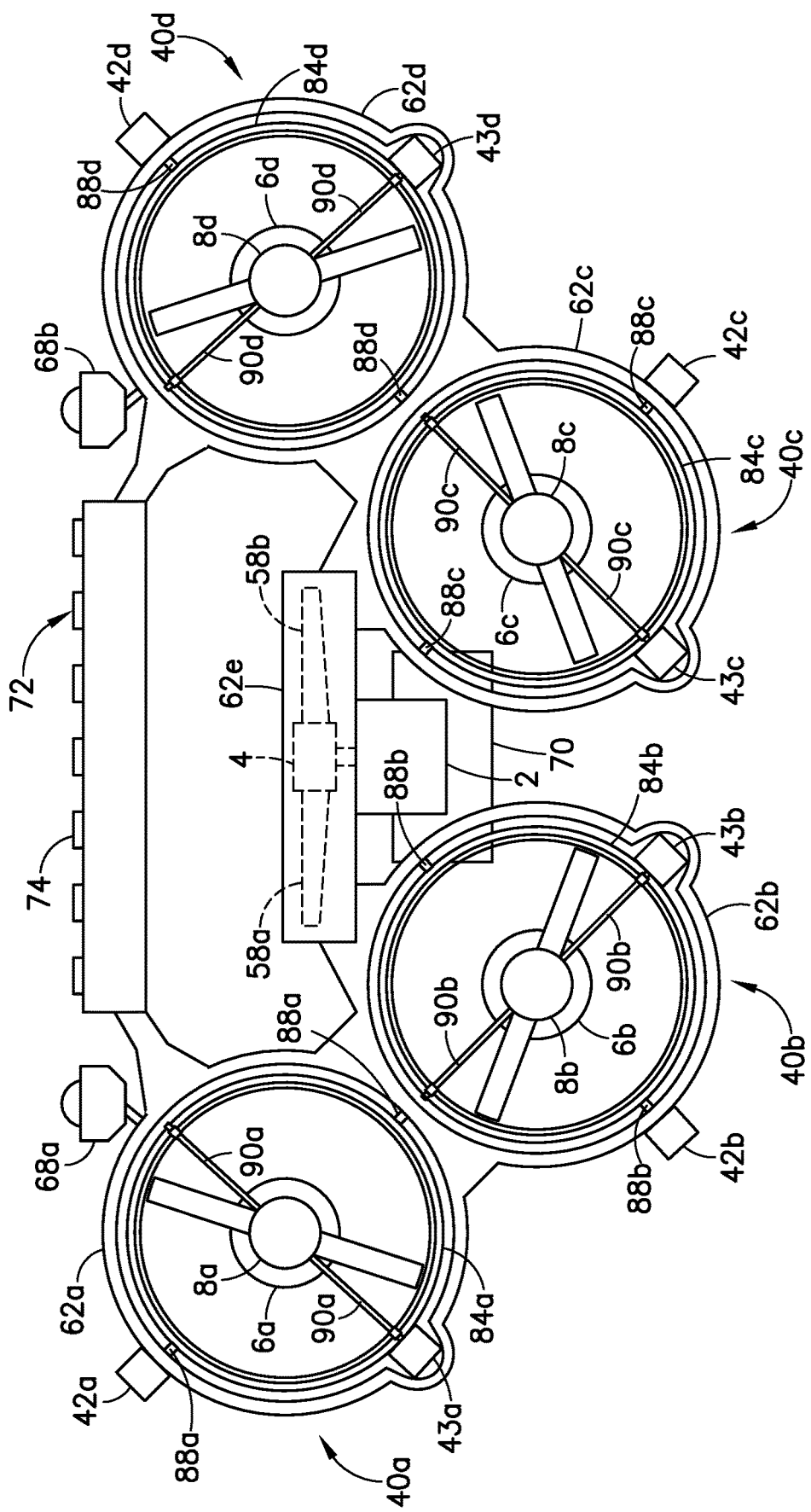
FIG. 7 is a diagram representing a top view of a UAV equipped with a sensor array and gimbal-mounted vertical rotors in accordance with another embodiment.

2-5, in which the axes of rotation of the rotors are fixed relative to the UAV frame, the orientation of the UAV may be changed by generating unequal individual rotor thrusts. In accordance with alternative embodiments, the axes of rotation of the rotors are variable relative to the UAV frame. FIG. 7 is a diagram representing a top view of a UAV 20 equipped with a sensor array 72 and gimbal-mounted vertical rotors 8a-8d.

The UAV 20 depicted in FIG. 7 differs from the UAV depicted in FIG. 2 only in that the four vertical rotors 8a-8d are mounted on respective two-axis gimbals 40a-40d which enable the rotor masts (not visible in FIG. 7) of the vertical rotors 8a-8d to be tilted. The two-axis gimbals 40a-40d rotatably couple respective rotor motors 6a-6d to the frame 60. Each of the two-axis gimbals 40a-40d includes respective gimbal rings 84a-84d rotatably coupled to respective vertical rotor deflector rings 62a-62d, respective A-axis gimbal motors 42a-42d mounted to respective vertical rotor deflector rings 62a-62d for driving rotation of the respective gimbal rings 84a-84d relative to vertical rotor deflector rings 62a-62d, and respective B-axis gimbal motors 43a-43d mounted to respective gimbal rings 84a-84d for driving rotation of respective vertical rotors 8a-8d relative to gimbal rings 84a-84d. The two-axis gimbals 40a-40d further include respective pairs of A-axis axles 88a-88d (which enable the gimbal rings 84a-84d to rotate relative to vertical rotor deflector rings 62a-62d) and respective pairs of B-axis axles 90a-90d (which enable the vertical rotors 8a-8d to rotate relative to gimbal rings 84a-84d). The B axis is perpendicular to the A axis. The mounting of the vertical rotors 8a-8d on gimbals enables the UAV 20 to fly forward, backward or sideways or rotate while hovering.

Figure 7A:
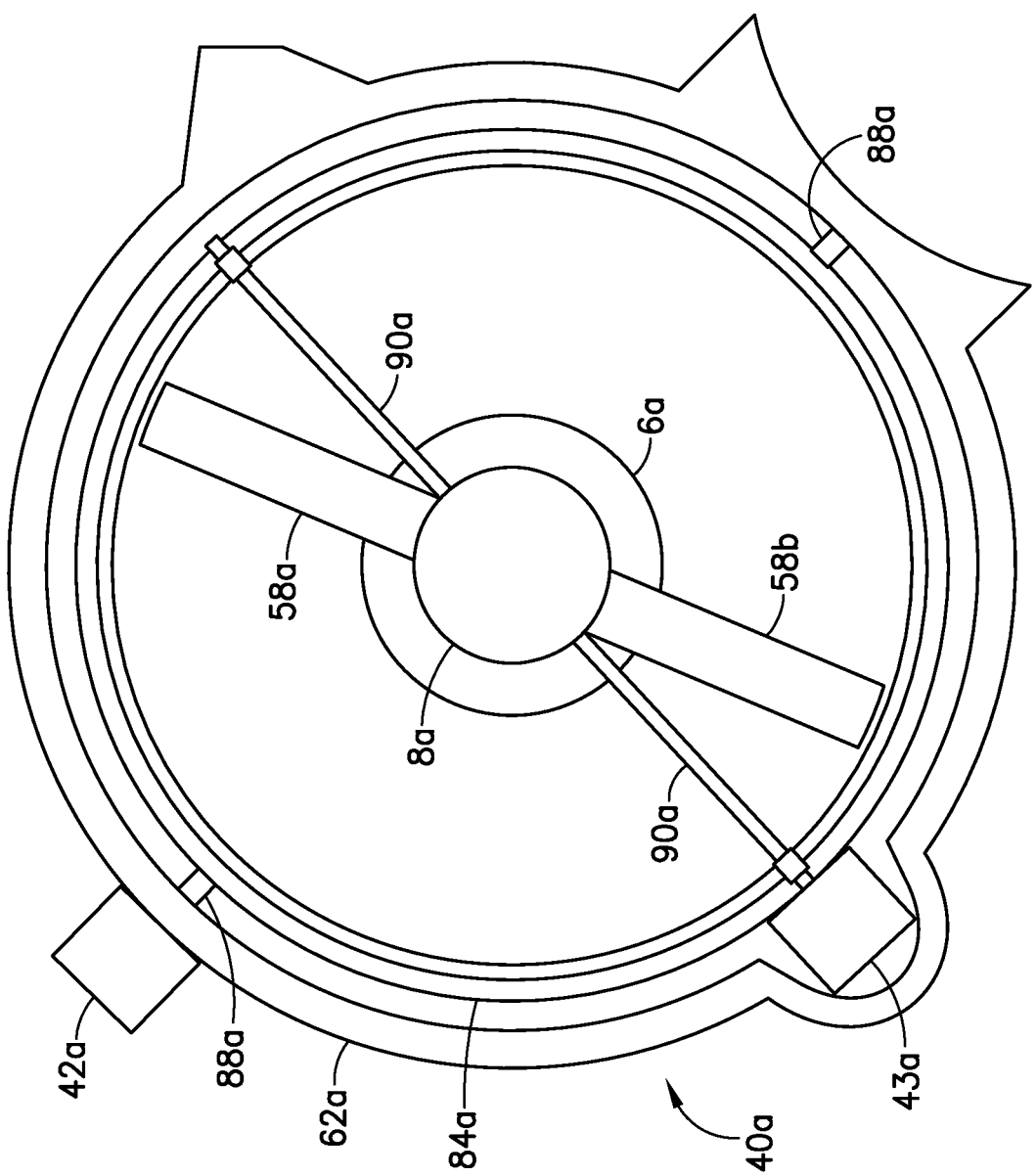
FIG. 7A is a diagram representing a top view with magnified scale of one of the gimbal-mounted vertical rotors depicted in FIG. 7.

FIG. 7A is a diagram representing a top view with magnified scale of gimbal-mounted vertical rotor 8a depicted in FIG. 7. In this instance, the vertical rotor 8a is mounted on a two-axis gimbal 40a. The gimbal ring 84a is rotatably coupled to and disposed within the perimeter of the vertical rotor deflector ring 62a, and the vertical rotor 8a along with the vertical rotor motor 6a are rotatably coupled to and disposed within the perimeter of the gimbal ring 84. More specifically, one pair of A-axis axles 88a are rotatably coupled to the vertical rotor deflector ring 62a and affixed to the gimbal ring 84a, enabling the gimbal ring 84a to rotate relative to the vertical rotor deflector ring 62a. In addition, one pair of B-axis axles 90a are rotatably coupled to gimbal ring 84a and affixed to the vertical rotor motor 6a, enabling the vertical rotor motor 6a to rotate relative to the gimbal ring 84a. The A and B axes are mutually perpendicular. Thus the vertical rotor motor 6a and the vertical rotor 8a may be tilted about the A-axis when gimbal ring 84a rotates relative to vertical rotor deflector ring 62a, and tilted about the B-axis when vertical rotor motor 6a rotates relative to gimbal ring 84a. In the same manner, the other vertical rotors 8b-8d are also tiltable about two axes. This construction enables the UAV 20 to be selectively rotated about pitch and roll axes as needed to help maintain the standoff contact elements 68a-68d in contact with the surface during scanning and help maintain the normal rotor 4 (which is fixed to the frame 60, not tiltable) so that its axis of rotation is generally normal to the confronting surface area being inspected. In addition, the orientation of the UAV 20 and sensor array 72 can be adjusted using the gimbaled rotors. The sensor array 72 may be held with a horizontal orientation while the gimbaled rotors are thrusting the UAV 20 sideways. Also, the sensor array 72 may be held at an angle while the UAV 20 is maneuvering in a different orientation.

Figure 8:
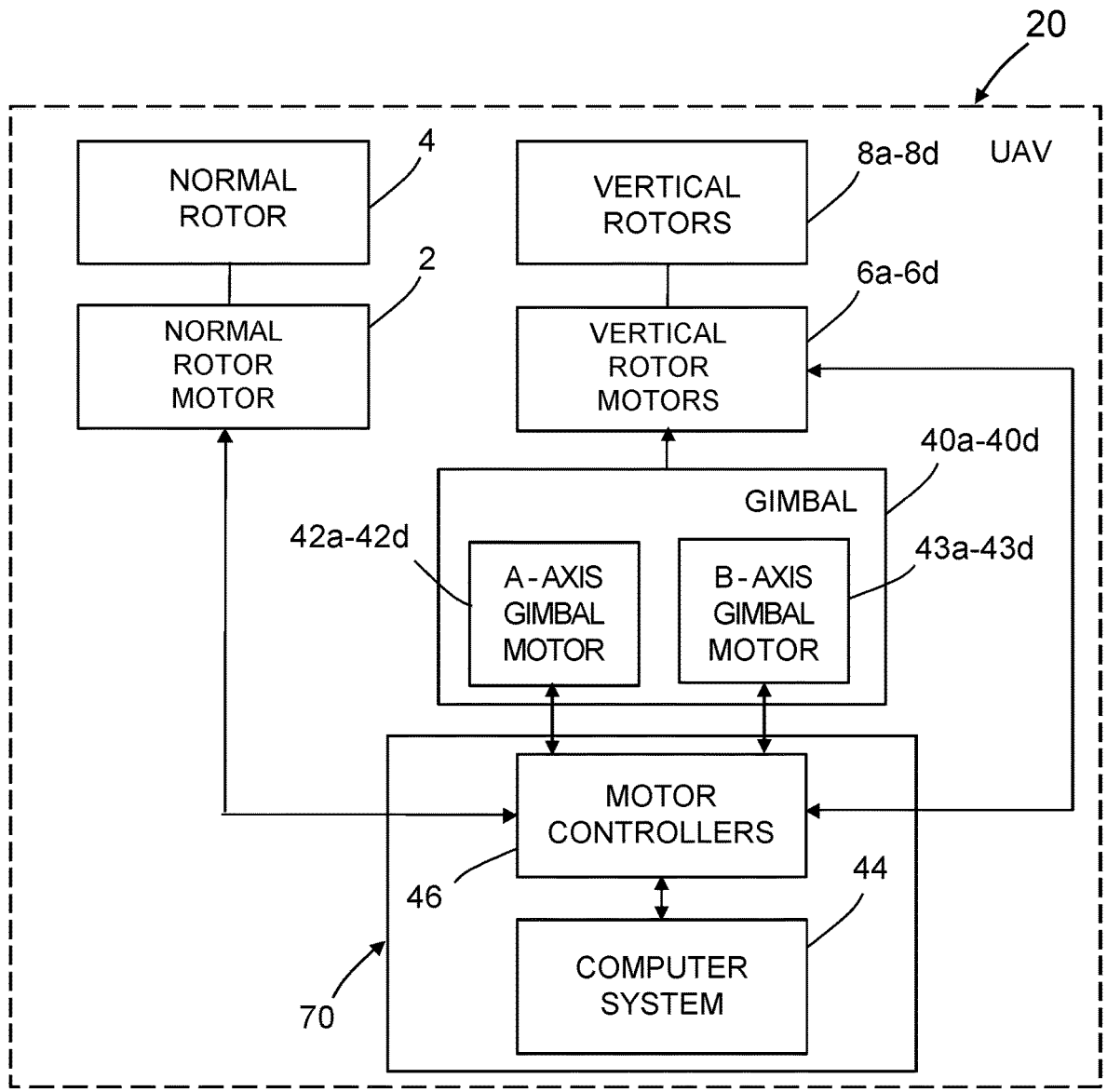
FIG. 8 is a block diagram identifying some components of the UAV depicted in FIG. 7.

FIG. 8 is a block diagram identifying some components of the UAV 20 depicted in FIG. 7. The UAV 20 depicted in FIG. 7 may also include the video camera 30, encoders 32, NDI sensor unit 34, IMU 36 and transceiver 38 identified in FIG. 6, but not included in FIG. 8

In accordance with the embodiment partly depicted in FIG. 8, the controller 70 includes a computer system 44 and a plurality of motor controllers 46 (one motor controller for each motor). One motor controller controls the operation of the normal rotor motor 2 that drives rotation of the normal rotor 4; a first set of four motor controllers respectively control the operation of the vertical rotor motors 6a-6d that respectively drive rotation of the vertical rotors 8a-8d; a second set of four motor controllers respectively control the operation of the A-axis gimbal motors 42a-42d that drive rotation of the gimbal rings 84a-84d; and a third set of four motor controllers respectively control the operation of the B-axis gimbal motors 43a-43d that drive rotation of the vertical rotors 6a-6d relative to the gimbal rings 84a-84d. The computer system 44 is programmed to coordinate the operation of all motors so that the UAV 20 follows a prescribed scanning path along the surface of the structure being inspected.

Figure 9:
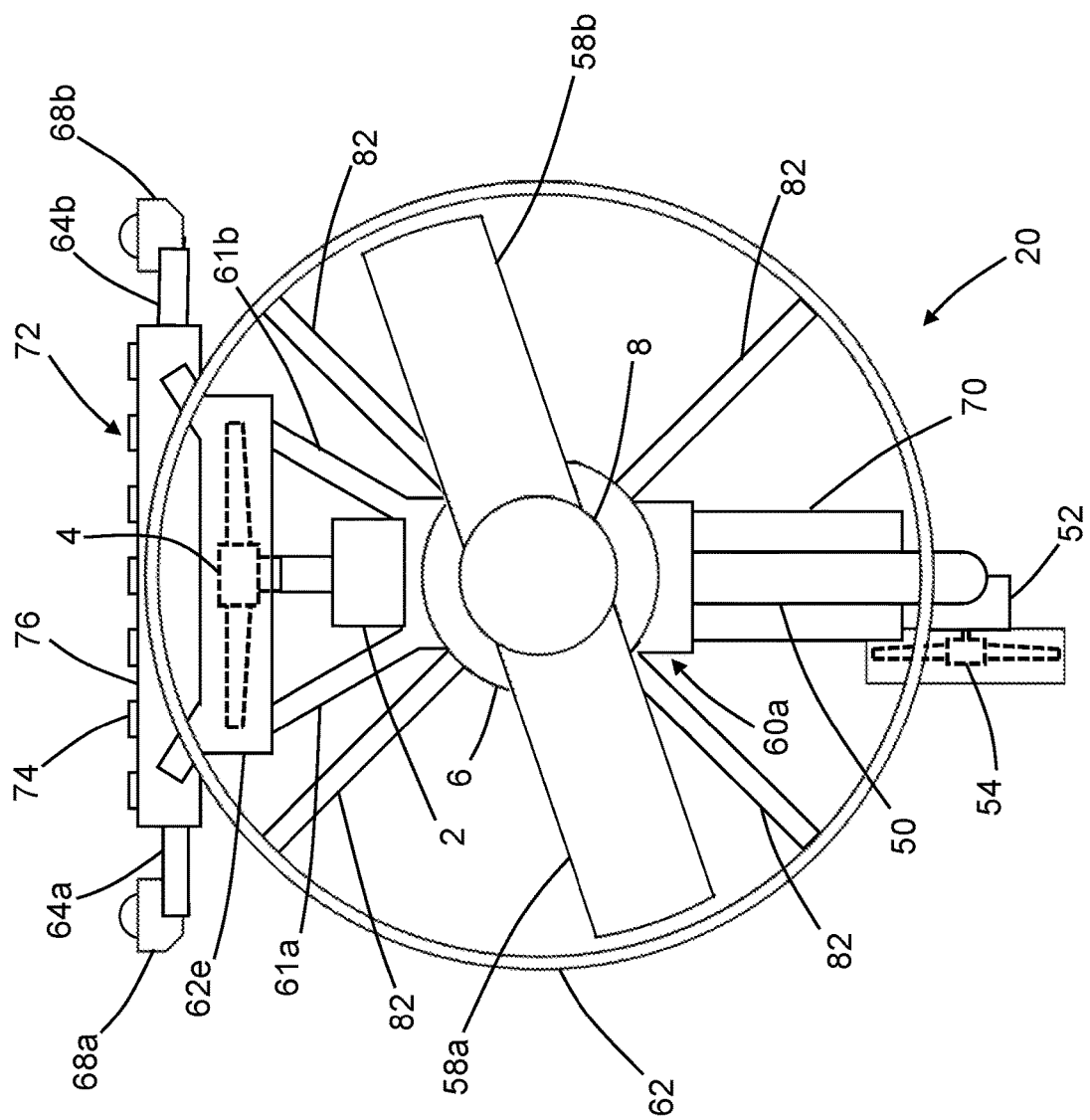
FIG. 9 is a diagram representing a top view of a UAV equipped with a sensor array in accordance with another embodiment.
Figure 10:
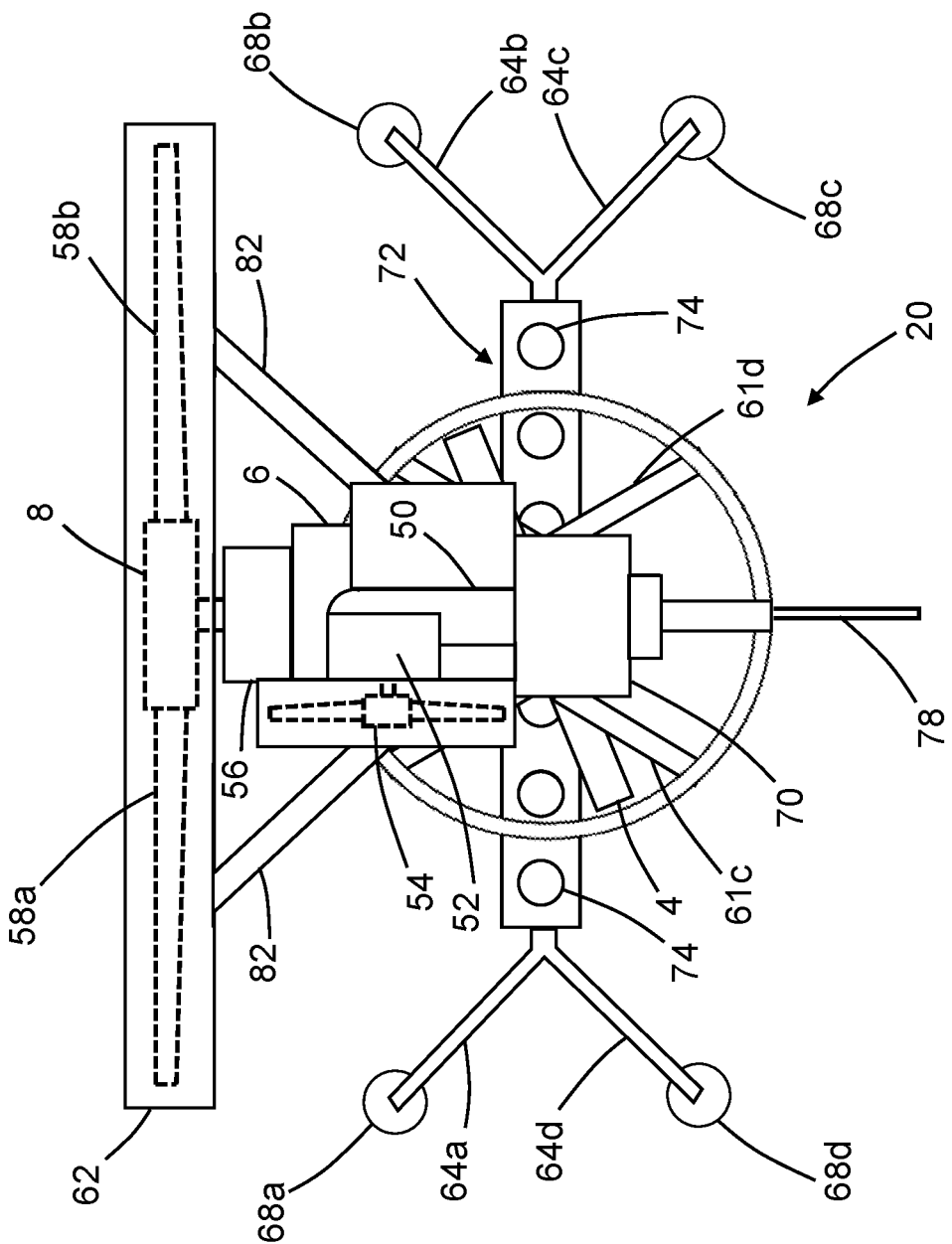
FIGS. 10 and 11 are diagrams representing rear and side views respectively of the UAV depicted in FIG. 9.
Figure 11:
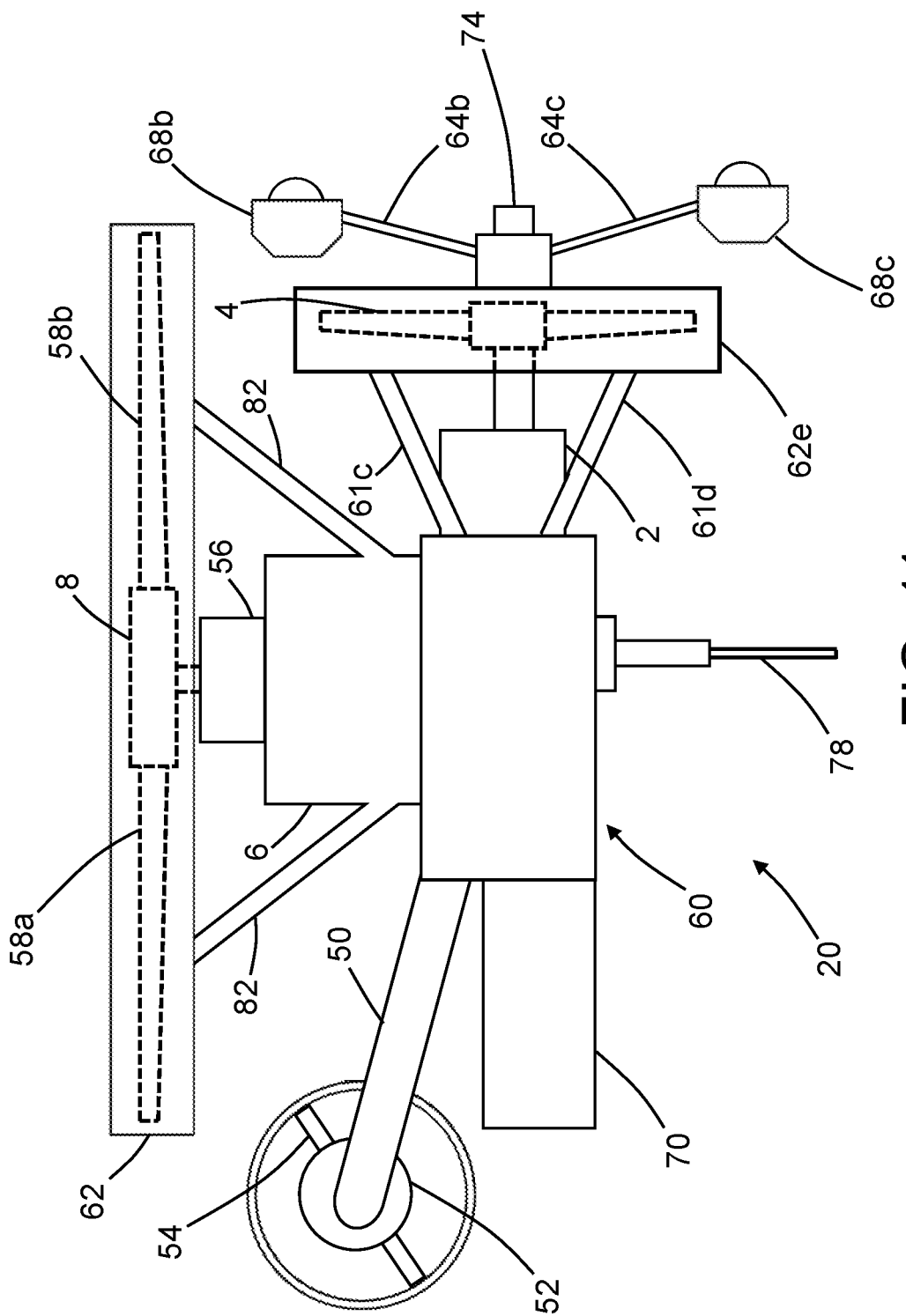

FIG. 9 is a diagram representing a top view of a UAV 20 equipped with a sensor array 72 in accordance with another embodiment. FIGS. 10 and 11 are diagrams representing rear and side views respectively of the UAV 20 depicted in FIG. 9. In alternative embodiments, the UAV 20 may be equipped with a maintenance tool other than a sensor array.

In addition to the sensor array 72, the UAV 20 depicted in FIGS. 9-11 includes a rotor system consisting of three rotors having axes of rotation which are generally mutually perpendicular, three rotor motors for driving rotation of the three rotors, and a controller 70. In this example, each rotor has two rotor blades 58a and 58b. In other examples, the rotors may have more than two rotor blades. As best seen in FIG. 9, the UAV 20 includes a vertical rotor 8 and a vertical rotor motor 6 which drives rotation of vertical rotor 8. As best seen in FIGS. 10 and 11, the vertical rotor 8 is coupled to the vertical rotor motor 6 by way of a swashplate 56. The swashplate 56 is mounted to the frame 60a and coupled to the vertical rotor 8 to enable control of a pitch of vertical rotor 8. The swashplate 56 is controlled by the controller 70. As best seen in FIG. 10, the UAV 20 also includes a normal rotor 4 and a normal rotor motor 2 which drives rotation of normal rotor 4. As best seen in FIG. 11, the UAV 20 also includes a tail rotor 54 and a tail rotor motor 52 which drives rotation of tail rotor 54. The tail rotor 54 is a smaller rotor mounted so that its axis of rotation is generally horizontal when the UAV 20 is flying level. The position and distance of the tail rotor 54 from the center of gravity of the UAV 20 allow it to develop thrust to counter the torque effect created by the vertical rotor 8.

The UAV 20 depicted in FIGS. 9-11 includes a frame 60 designed to support the aforementioned rotors, motors, controller and sensor array. As best seen in FIG. 9, frame 60 includes a vertical rotor deflector ring 62 and a tail rotor support beam 50. As best seen in FIGS. 9 and 10, the frame 60 further includes a normal rotor deflector ring 62 supported by four struts 61a-61d.

As best seen in FIG. 9, the frame 60 further includes a sensor support plank 76 attached to the normal rotor deflector ring 62e. The sensor support plank 76 supports a sensor array 72 that includes a plurality of sensors 74 (e.g., ultrasonic transducers or eddy current probes). The plurality of sensors 74 may be arranged in one or more rows, the sensors in each row being arranged with equal spacing between adjacent sensors. For example, the sensor support plank 76 may be formed with openings in which the sensors 74 are respectively installed.

As best seen in FIG. 10, the frame 60 further includes four standoff support members 64a-64d which extend from the sensor support plank 76 in the manner of cantilever beams. Four standoff contact elements 68a-68d are coupled to distal ends of respective standoff support members 64a-64d. In the example embodiment depicted in FIGS. 2-5, the standoff contact elements 68a-68d are respective ball rollers. In one alternative embodiment, the standoff contact elements 68a-68d are wheels having mutually parallel axes of rotation. In another alternative embodiment, the standoff contact elements 68a-68d are pivotably coupled sliding blocks capable of adjusting their angular position to lie flat on a non-planar surface when the standoff contact elements 68a-68d are placed in contact with that non-planar surface. The sliding blocks have low-friction surfaces suitable for sliding along a surface of a structure. Preferably the frame 60a of UAV 20 is configured so that the standoff contact elements 68a-68d may all contact a surface (e.g., a planar surface) at the same time.

The frame 60 is configured such that the sensor array 72 (or other maintenance tool) is supported in a fixed position relative to the plurality of standoff contact elements 68a-68d. Thus when the standoff contact elements 68a-68d all contact a surface of a structure, the sensor array 72 will have a specified position with respect to the confronting area of the surface. Depending on the type of sensor being used, the frame 60 may be designed such that the sensors 74 of the sensor array 72 will be in contact with or at a standoff distance from the surface being contacted by standoff contact elements 68a-68d. In the case wherein the sensor array 72 is separated from the confronting surface by a standoff distance, the sensors 74 are preferably separated from the surface by equal standoff distances.

The UAV 20 depicted in FIGS. 9-11 further includes a controller 70. The controller 70 controls the operation of the normal rotor motor 2, vertical rotor motor 6 and tail rotor motor 52. The motors may be electric or internal combustion engines. For electrical variants, the power may be supplied by an onboard battery or by a power source on the ground via an electrical cable 78 as shown in FIGS. 10 and 11. The electrical cable 78 may optionally also include wires for conducting electrical control signals from a ground station to the controller 70 and conducting electrical sensor data signals from an onboard NDI sensor unit to the ground station.

A UAV 20 in accordance with any one of the above-described embodiments may be used to perform a maintenance operation in a limited-access surface area on a structure. The UAV 20 may be moved intermittently to successive locations whereat a respective maintenance operation is performed. Or the UAV 20 may be moved continuously to cause the maintenance tool (e.g., an NDI sensor unit) to scan the surface.

For the purpose of illustration, one example maintenance operation will now be described with reference to FIGS. 12A-12E, which diagrams represent views of a UAV 20 at respective stages of a process for inspecting an airfoil-shaped body 100. In this example, the airfoil-shaped body 100 is a wind turbine blade having two side surfaces 104 and 106 which are connected by a curved leading edge 102 and which intersect at an angled trailing edge (not shown in FIGS. 12A-12E). The arrows in FIGS. 12A through 12E indicate the directions in which air is being propelled by the rotating rotors. The thrust produced, being a reaction force, will be in the opposite direction.

Figure 12A:
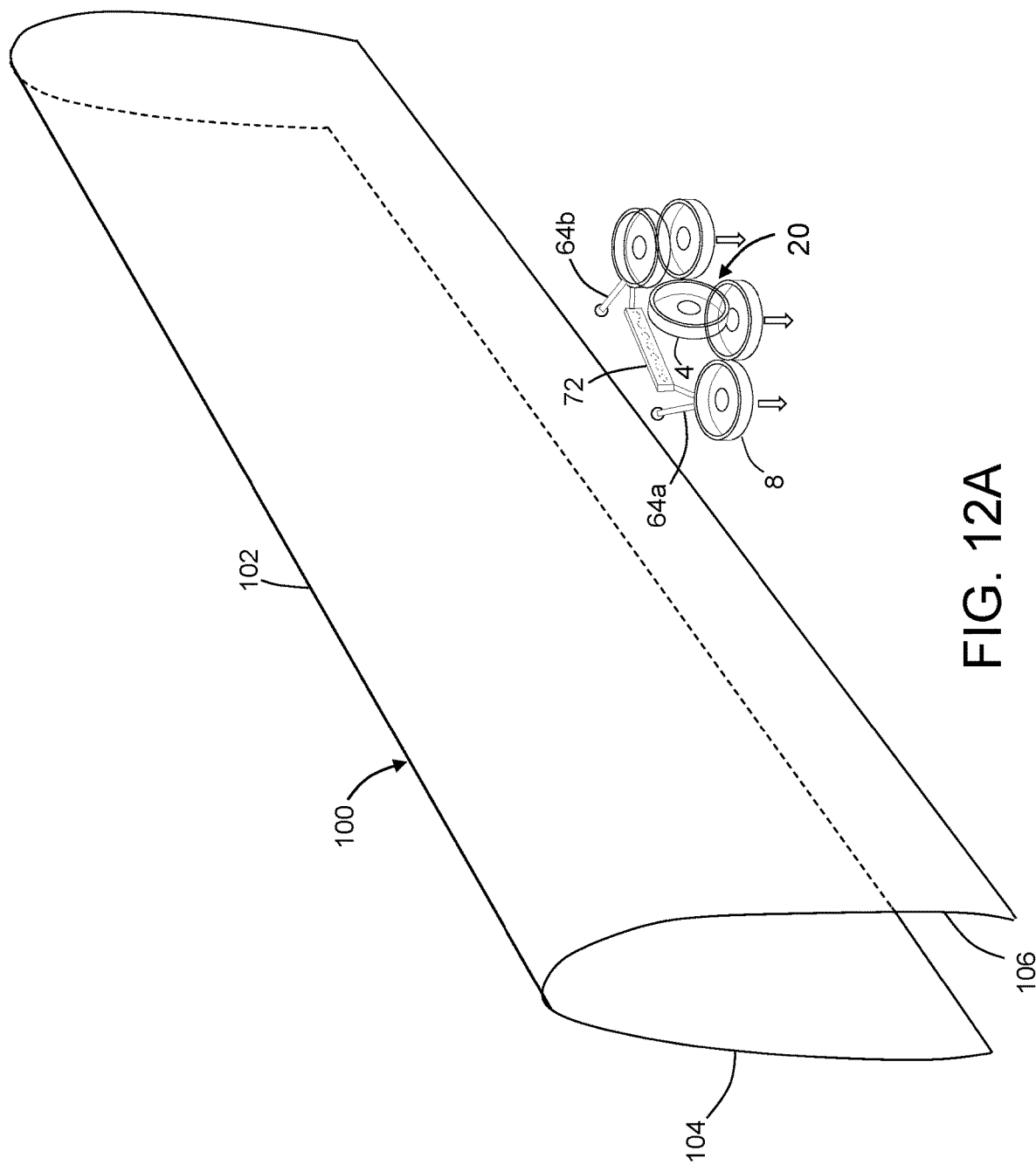
FIGS. 12A through 12E are diagrams representing views of a UAV equipped with a sensor array during respective stages of a remotely controlled procedure for NDI of an airfoil-shaped body.
Figure 12B:
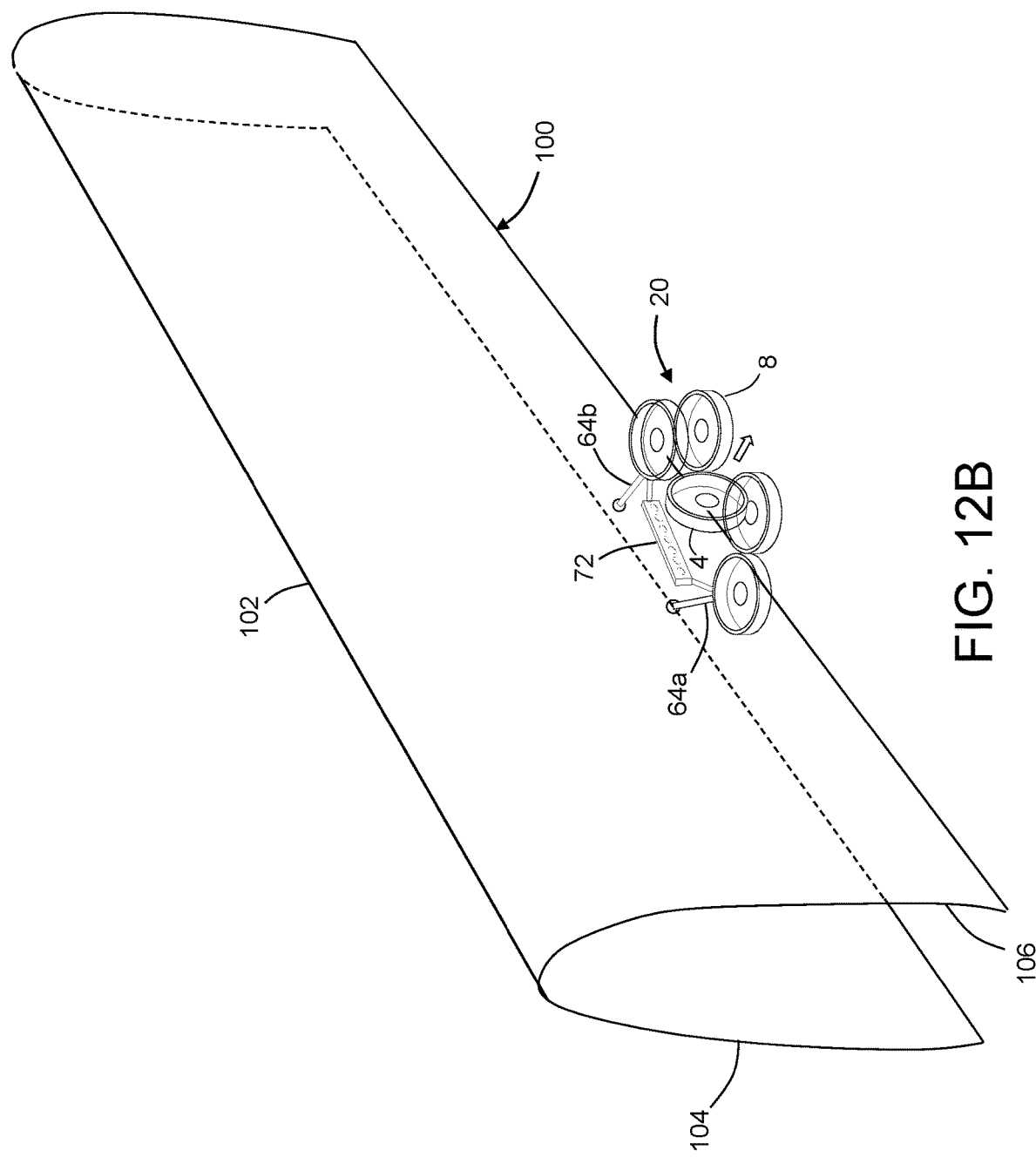
Figure 12C:
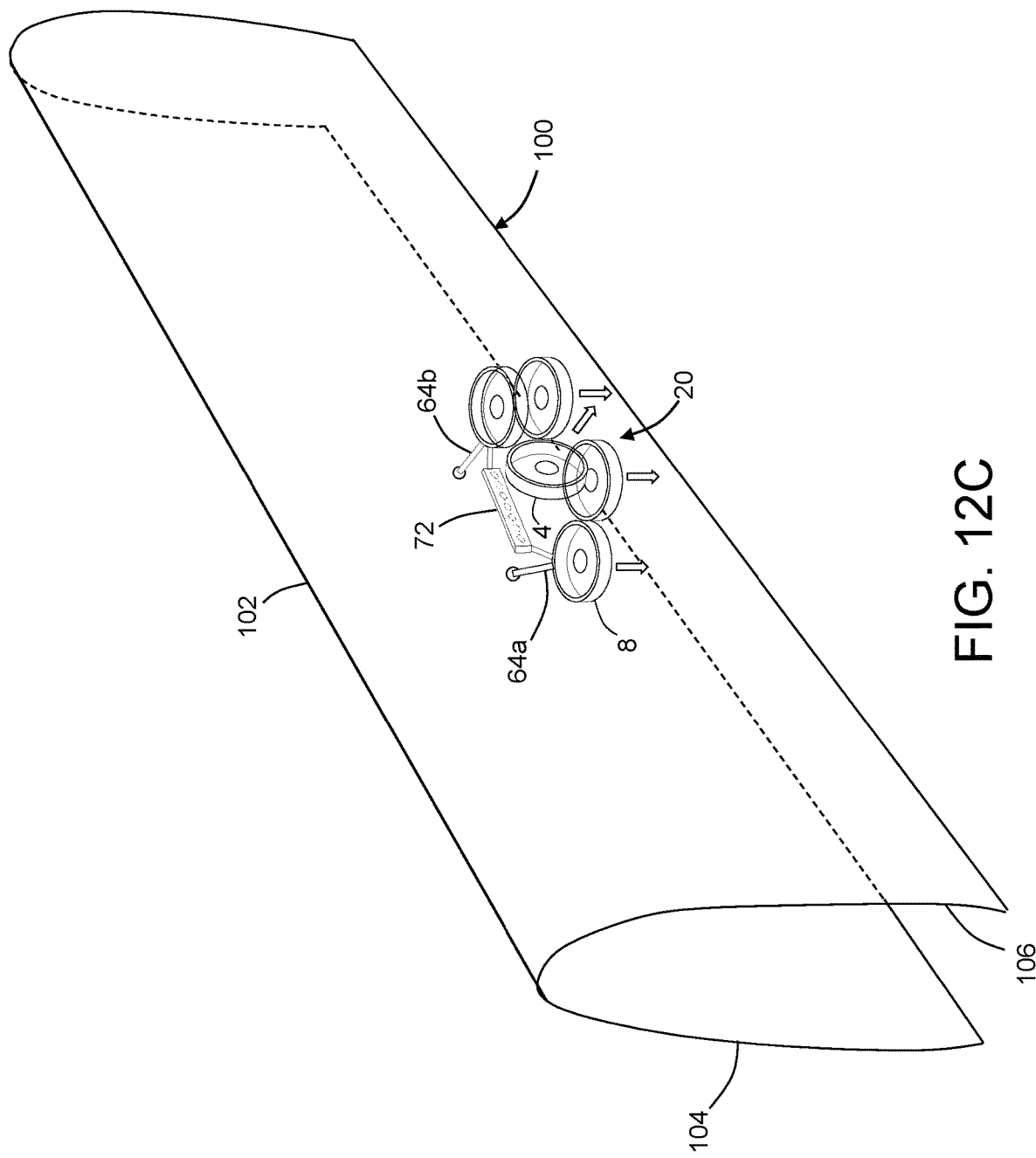

FIG. 12A shows a stage in the NDI operation wherein an airborne UAV 20, equipped with a sensor array 72 (and other components of an onboard NDI sensor unit not shown), is maneuvering toward the airfoil-shaped body 100. During such maneuvering, the vertical rotors are selectively operated to propel air (in directions indicated by arrows in FIG. 12A) in a manner that produces a net thrust that causes the UAV 20 to fly toward the airfoil-shaped body 100. As the UAV 20 approaches the airfoil-shaped body 100, proximity sensors (not shown in the drawings) may be operated to measure respective distances to the airfoil-shaped body 100, which measurements may then be used to align the standoff contact elements (only standoff contact elements 68a and 68b are shown in FIG. 12A) with respect to the side surface 106 of airfoil-shaped body 100.

The UAV 20 then flies to the location depicted in FIG. 12B (hereinafter "the first location"). To accomplish this movement, in addition to lift forces, a normal force thrust in the forward direction (hereinafter "forward thrust") is produced by rotating the normal rotor 4 to propel air in the direction indicated by the horizontal arrow in FIG. 12B. If the UAV 20 is level, this will cause the airborne UAV 20 to move horizontally. The forward thrust may be adjusted to ensure that the plurality of standoff contact elements 68a-68d (see FIG. 3) are not damaged when they come into contact with side surface 106. While the UAV 20 is hovering at the location depicted in FIG. 12B with the plurality of standoff contact elements 68a-68d in contact with respective areas on side surface 106, the normal rotor 4 continues to produce a forward thrust that presses the standoff contact elements 68a-68d against the side surface 106, thereby setting the standoff distance for the sensor array 72.

While the UAV 20 is hovering adjacent to and in contact with side surface 106 at the first location, the sensor array 72 is activated to acquire NDI sensor data. The UAV 20 then moves from the first location shown in FIG. 12B to a second location shown in FIG. 12C while maintaining standoff contact elements 68a-68d in contact with respective areas of the side surface 106. While the UAV 20 is hovering at the second location and in contact with side surface 106, the sensor array 72 is activated to acquire additional NDI sensor data. Optionally, the sensor array 72 may also be activated to continuously acquire additional NDI sensor data from side surface 106 as the UAV 20 moves from the first location to the second location. During the upward movement from the first location to the second location, the normal rotor produces a forward thrust that presses the standoff contact elements 68a-68d against the side surface 106, while the vertical rotors produce upward thrusts that lift the UAV 20 to a higher elevation. The respective directions in which the rotating rotors propel air are indicated by arrows in FIG. 12C.

Figure 12D:
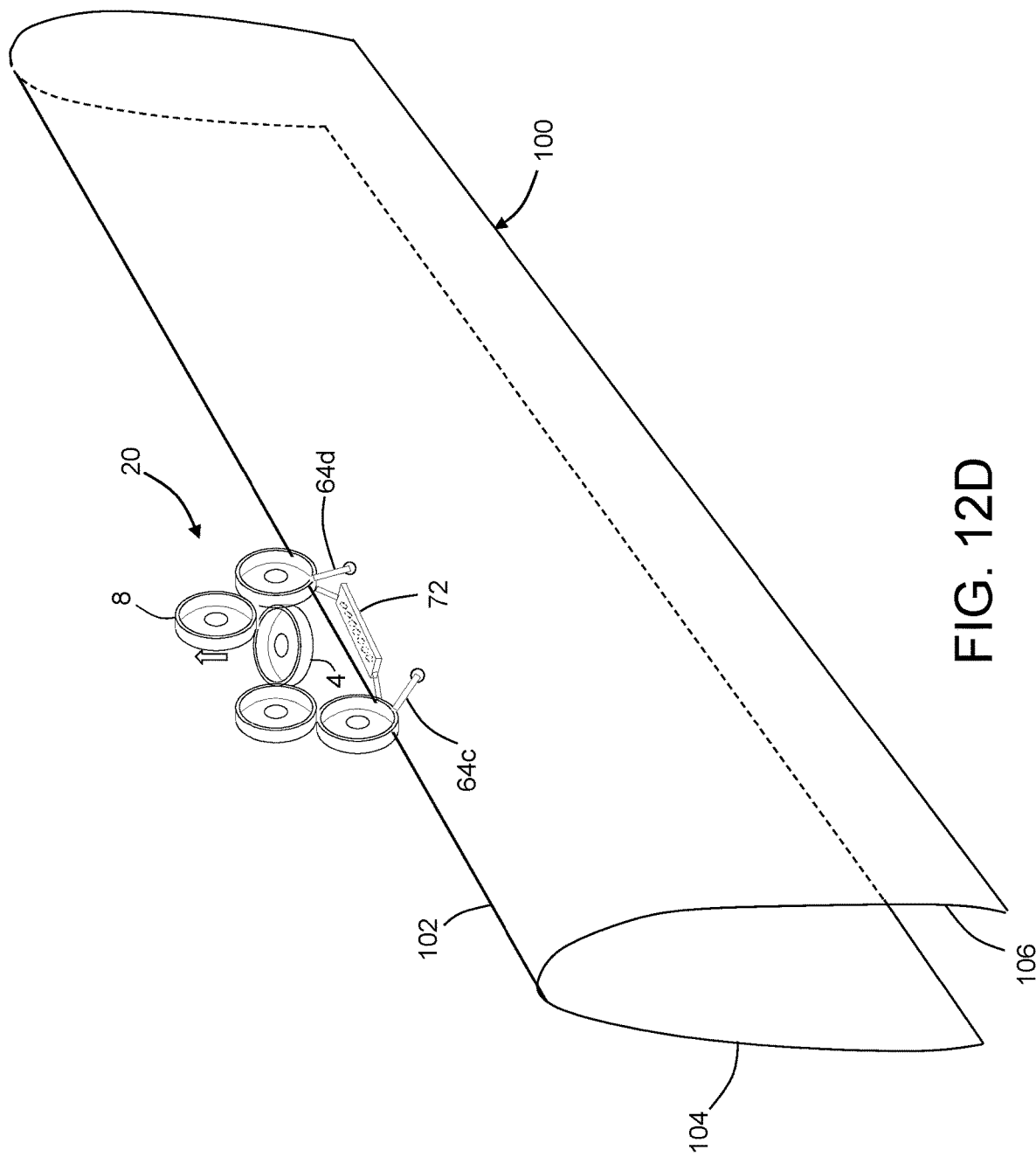
Figure 12E:
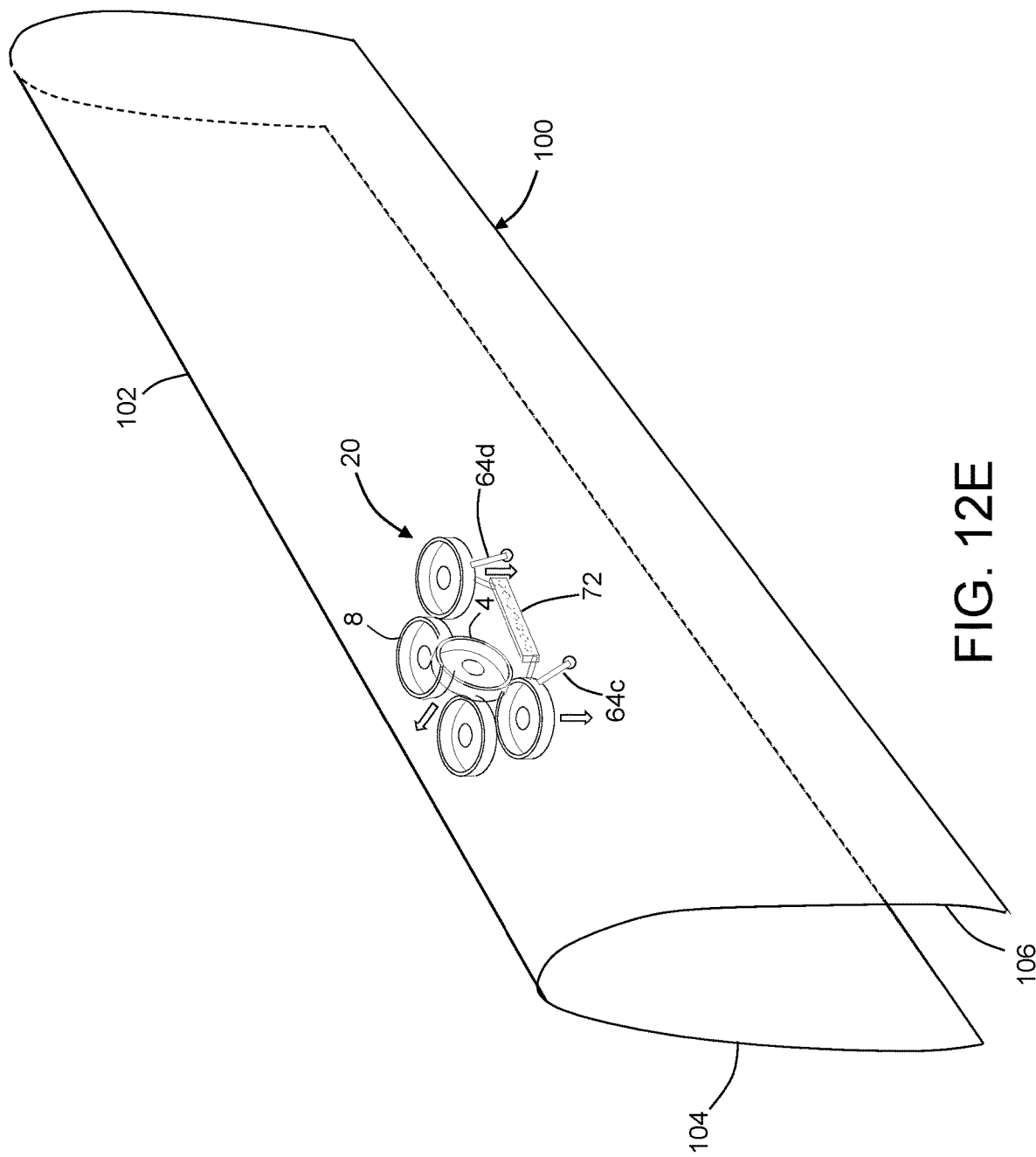

In the case of the airfoil-shaped body 100 depicted in FIGS. 12A-12E, the scanning process during an NDI procedure may start on one side surface 106, continue as the UAV 20 follows the profile of the leading edge 102 (shown in FIG. 12D), and then continues on the other side surface 104 (shown in FIG. 12E). At the stage depicted in FIG. 12D, the UAV is standing on the curved surface of the leading edge 102 of the airfoil-shaped body 100 with the sensor array 72 facing downward. More specifically, the UAV 20 depicted in FIG. 12D is oriented vertically with the standoff contact elements 68a-68d arranged to contact the curved surface of the leading edge 102 and the sensor array 72 either in contact with or setoff from the same surface when the standoff contact elements 68a-68d all contact the surface. The UAV 20 may be held at this third location while the sensor array 72 is activated to acquire NDI sensor data from the leading edge 102. This may be accomplished by stopping rotation of the vertical rotors 8 and reversing their rotation as the momentum from the UAV 20 carries to the side surface 104. The normal force rotor 4 continues to provide forward thrust that keeps the standoff contact elements 68a-68d in contact with the airfoil-shaped body 100.

Thereafter, the vertical rotors may be activated to produce the thrusts required to move the UAV 20 from the third location depicted in FIG. 12D to a fourth location adjacent to and in contact with the other side surface 104 of the airfoil-shaped body 100. For the sake of illustration, UAV 20 is visible in FIG. 12E even though it is behind the airfoil-shaped body 100 and would ordinarily be hidden when viewed from the vantage point of FIG. 12E. At the fourth location, the UAV 20 is now upside-down relative to its location as depicted in FIG. 12B with the standoff contact elements 68a-68d now in contact with (and pressed against) the other side surface 104 of the airfoil-shaped body 100. The UAV 20 may be held at this fourth location while the sensor array 72 is activated to acquire NDI sensor data from the leading edge 102. Holding the UAV 20 at the fourth location may be accomplished by rotating the upside-down vertical rotors 8 in the opposite direction from the direction in which they were rotating during the stage depicted in FIG. 2 while rotating the normal rotor 4 to produce a forward thrust in a direction opposite to the sideways-pointing arrow in FIG. 12E).

In addition to ultrasonic and eddy current inspection techniques, optical imaging, infrared thermography, laser shearography, and digital radiography are other inspection methods that could be applied using the apparatus and methodology disclosed herein. Such image-based sensing methods require some standoff with the structure being inspected. For example, an imager or two-dimensional detector array may be supported by the UAV frame at a small distance away from the structure.

As previously mentioned, as the UAV 20 scans across the surface of a structure, the position of the maintenance tool may be tracked using encoders. For example, the standoff contact elements may be rotary encoders. For higher fidelity, encoders supplemented with an off-board positioning method, such as tracking using a local positioning system or motion capture using cameras mounted The apparatus disclosed herein can be adapted for use in the automation of various maintenance functions, including but not limited to: nondestructive inspection, painting, light sanding, cleaning, drilling (with a suction cup attachment to react the drill forces), target attachment (motion capture targets, NDI targets, visual survey targets), decal attachment, damage marking (to denote the outer extent of visible or inspected damage), placement of materials (repair adhesive, repair composite plies, release film, breather material, vacuum bag), and application of repair adhesive tape. Additional maintenance functions which could be performed using a UAV include coating removal using abrasive pellets, laser ablation, chemical treatment, etc. as well as surface treatments for corrosion prevention, abrasion resistance or application of specialized coatings.

Figure 13:
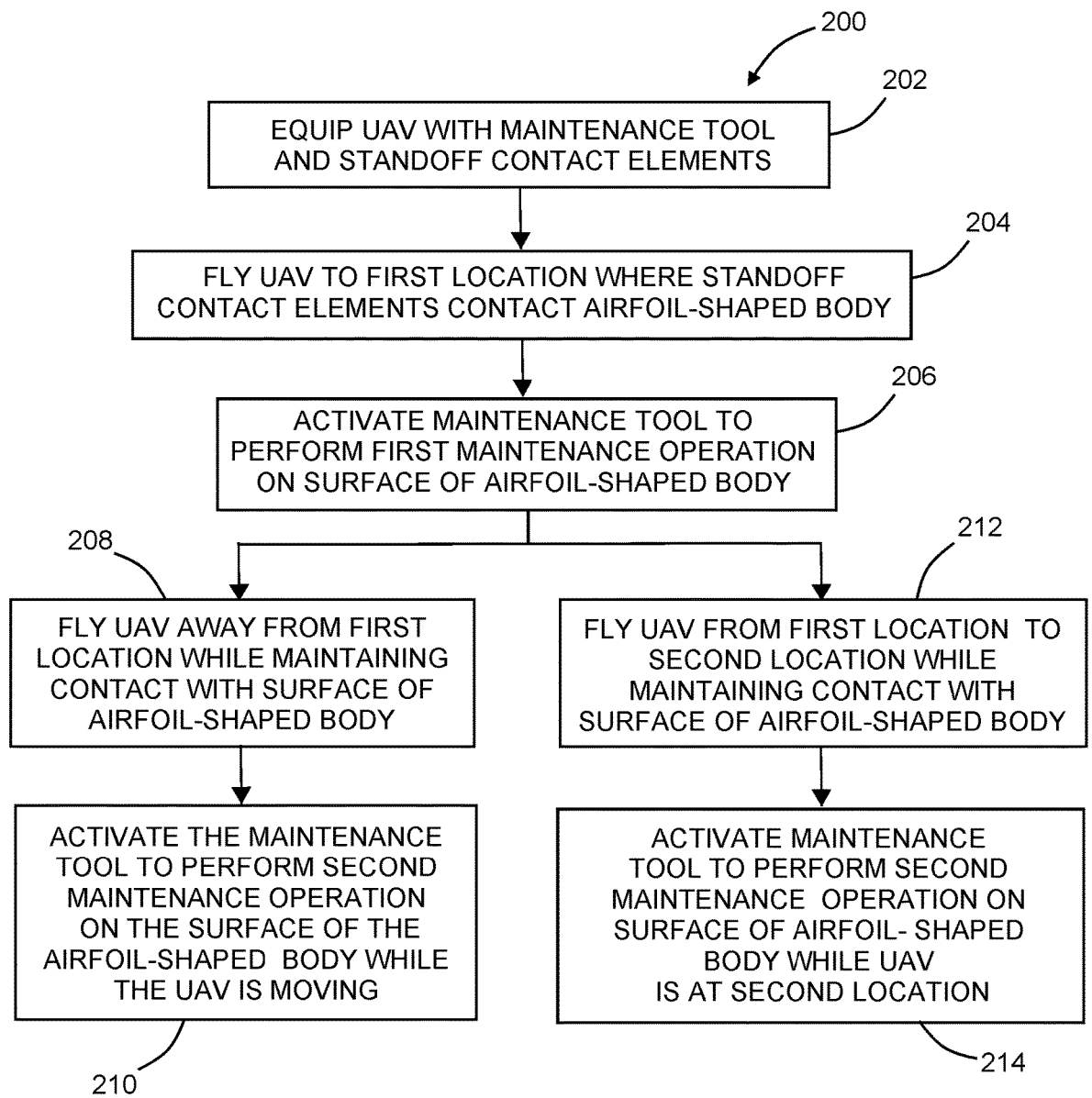
FIG. 13 is a flowchart identifying steps of a method for performing a maintenance operation on an airfoil-shaped body using a UAV equipped with a maintenance tool.

FIG. 13 is a flowchart identifying steps of a method 200 for performing a maintenance operation on an airfoil-shaped body using a UAV in accordance with one embodiment. First, a UAV is equipped with a maintenance tool (e.g., an NDI sensor unit having a sensor array) and a plurality of standoff contact elements (step 202). The plurality of standoff contact elements are arranged to simultaneously contact a surface of the airfoil-shaped body. The maintenance tool is arranged to confront an area on the surface of the airfoil-shaped body while the plurality of standoff contact elements are in contact with the surface. Then the UAV operator flies the UAV to a first location whereat the plurality of standoff contact elements contact respective areas on a surface of the airfoil-shaped body (step 204). While the UAV is at the first location with the plurality of standoff contact elements in contact with the surface of the airfoil-shaped body, the maintenance tool is activated to perform a first maintenance operation on the surface of the airfoil-shaped body (step 206).

The computer system onboard the UAV may be configured to control the movements of the UAV and the operations of the maintenance tool such that the maintenance operation is performed intermittently at successive spaced-apart locations of the UAV or continuously along a scan path followed by the UAV. If the maintenance operations are performed continuously along a scan path, then upon completion of step 206, the UAV is flown away from the first location while maintaining the plurality of standoff contact elements in contact with the surface of the airfoil-shaped body (step 208). Then while the UAV is moving away from the first location with the plurality of standoff contact elements in contact with the surface of the airfoil-shaped body, the maintenance tool is activated to perform a second maintenance operation on the surface of the airfoil-shaped body (step 210).

In contrast, if the maintenance operations are performed intermittently at successive spaced-apart locations, then upon completion of step 206, the UAV is flown from the first location to a second location. Optionally the UAV may be "flown" along a path that maintains the plurality of standoff contact elements in contact with the surface of the airfoil-shaped body (step 212). Then while the UAV is at the second location with the plurality of standoff contact elements in contact with the surface of the airfoil-shaped body, the maintenance tool is activated to perform a second maintenance operation on the surface of the airfoil-shaped body (step 214).

In the case where the maintenance tool is an NDI sensor unit, step 208 comprises moving the NDI sensor unit along a scan path that follows the surface of the airfoil-shaped body, and step 210 comprises activating the NDI sensor unit to acquire NDI sensor data representing characteristics of the airfoil-shaped body during movement of the NDI sensor unit along the scan path. This technique may be used to inspect a wind turbine blade in which the NDI sensor unit-equipped UAV circumnavigates the wind turbine blade except at the angled trailing edge. For example, the UAV may move from a location adjacent to the trailing edge and in contact with one side surface of a wind turbine blade, and then fly (while maintaining contact along the way) to a location on the curved leading edge of the wind turbine blade, and thereafter fly (while maintaining contact along the way) to a location adjacent to the trailing edge and in contact with the other side surface of the wind turbine blade, acquiring a swath of NDI sensor data continuously as the UAV travels around the wind turbine blade.

Multiple UAVs of the types described above can be used at the same time during maintenance operations at large structures. For example, a plurality of tool-equipped UAVs (e.g., rotorcraft) may be moved around a structure requiring periodic inspection. Such a system includes a computer system for controlling the flight of the UAVs, the operations of the maintenance tools and the acquisition of data. The system may be adapted for use in inspecting a wide range of structures including, but not limited to, wind turbine blades, storage tanks, aircraft, power plants, dams, levees, stadiums, high-rise buildings, large antennas and telescopes, water treatment facilities, oil refineries, chemical processing plants, and infrastructure associated with electric trains and monorail support structures. The system is also particularly well suited for use inside large buildings such as manufacturing facilities and warehouses. Virtually any structure that would be difficult, costly, or hazardous to inspect by a human-piloted vehicle or a human lifted by a crane may potentially be inspected using a swarm of tool-equipped UAVs.

In accordance with one embodiment, each UAV includes an onboard system that is able to navigate the UAV in accordance with a preprogrammed flight plan and control the NDI sensor unit to acquire NDI sensor data while the UAV is hovering adjacent to or skimming along a surface of the structure being inspected. The preprogrammed flight plan carried by each UAV enables each UAV to follow a respective unique flight path around a portion of the structure being inspected. Thus, it will be appreciated that the preprogrammed flight plan (and therefore flight path) for each UAV is unique and formed with respect to a designated portion of the structure to be inspected. Generally, the greater the number of UAVs employed in any given inspection task, the shorter the duration of time to complete the inspection task.

The system further may include a control station 10 (see FIG. 6) for receiving wireless communications from each of the UAVs 20. The control station 10 may include a computer control system and a display monitor for viewing by an inspection technician or operator. A transceiver 14 is in wireless communication with the transceivers 38 for enabling wireless communication between the computer control system and the onboard computer system 44 of each UAV 20. The computer control system may be configured to send commands to each UAV 20, to receive NDI sensor data from the NDI sensor unit 34 carried by each UAV 20, or to monitor various operating performance parameters of each UAV 20 such as fuel remaining. The computer control system may also be used generate commands to alter the flight plan of any one of the UAVs 20.

The onboard computer system 44 may include guidance and control software configured to implement a pre-stored flight plan. The onboard system may include a global positioning system (GPS)/inertial navigation system for controlling the orientation of its associated UAV 20 and assisting in carrying out the pre-stored flight plan. A wireless transceiver 38 and an onboard antenna (not shown in FIG. 6) enable bidirectional, wireless electromagnetic wave communications with the control station 10.

A multiplicity of NDI sensor unit-equipped UAVs may be deployed to form an inspection "swarm". When the UAVs reach the structure to be inspected, each UAV begins acquiring NDI sensor data for the portion of the structure which that UAV has been designated to inspect. In one proposed implementation, the UAVs transmit their acquired NDI sensor data to the control station 10 via their transceivers 38 and antennas. Alternatively the UAVs could each store their acquired NDI sensor data in a non-transitory tangible computer-readable storage medium onboard the UAV for future downloading once the UAV lands.

While methods for performing a maintenance operation on a limited-access surface of a structure or object using remotely controlled unmanned aerial vehicles have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "location" comprises position in a three-dimensional coordinate system and orientation relative to that coordinate system.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a computer system, cause the tool-equipped unmanned aerial vehicle to perform at least a portion of the methods described herein.

The invention claimed is:

1. A method for performing a maintenance operation using an unmanned aerial vehicle, comprising:
   (a) the unmanned aerial vehicle flies to a first location whereat a plurality of standoff contact elements of the unmanned aerial vehicle contact respective areas on a surface of a structure;
   (b) the unmanned aerial vehicle hovers at the first location with the standoff contact elements in contact with the surface of the structure;
   (c) the unmanned aerial vehicle skims along a path on the surface of the structure along a path that extends from the first location to a second location; and
   (d) a maintenance tool on-board the unmanned aerial vehicle performs a maintenance operation while the unmanned aerial vehicle is located along the path with the standoff contact elements in contact with the surface of the structure.

2. The method as recited in claim 1, wherein the maintenance tool is a sensor array, step (c) comprises moving the sensor array along a scan path that follows the surface of the structure, and step (d) comprises activating the sensor array to acquire nondestructive inspection sensor data representing characteristics of the structure during movement of the sensor array along the scan path.

3. The method as recited in claim 1, wherein the maintenance tool is a nondestructive inspection sensor unit, step (c) comprises moving the nondestructive inspection sensor unit along a scan path that follows the surface of the structure, and step (d) comprises activating the nondestructive inspection sensor unit to acquire nondestructive inspection sensor data representing characteristics of the structure during movement of the nondestructive inspection sensor unit along the scan path.

4. The method as recited in claim 1, wherein the unmanned aerial vehicle is propelled by thrust produced by at least one rotor during skimming of the unmanned aerial vehicle along the path.

5. The method as recited in claim 4, wherein step (c) comprises controlling the operation of a rotor motor that drives rotation of a rotor to produce a thrust that maintains the plurality of standoff contact elements in contact with the surface.

6. The method as recited in claim 4, wherein step (c) further comprises controlling the operation of rotor motors that drive rotation of respective rotors having respective axes of rotation that are vertical when the unmanned aerial vehicle is hovering and level.

7. The method as recited in claim 6, wherein step (c) further comprises controlling the operation of gimbal motors that drive tilting of respective rotor masts of the respective rotors relative to a frame of the unmanned aerial vehicle.

8. The method as recited in claim 6, wherein step (c) further comprises:
controlling the operation of a first set of gimbal motors that drive rotation of respective gimbal rings relative to respective deflector rings attached to a frame of the unmanned aerial vehicle; and
controlling the operation of a second set of gimbal motors that drive rotation of respective rotors relative to the respective gimbal rings.

9. The method as recited in claim 1, wherein the structure is a wind turbine blade.

10. The method as recited in claim 1, wherein the structure is an aircraft.

11. The method as recited in claim 1, wherein the structure is a storage tank.

12. The method as recited in claim 1, wherein step (c) comprises controlling the operation of a rotor motor that drives rotation of a rotor to produce a thrust that maintains the plurality of standoff contact elements in contact with the surface.

13. The method as recited in claim 1, wherein step (c) further comprises controlling the operation of rotor motors that drive rotation of respective rotors having respective axes of rotation that are vertical when the unmanned aerial vehicle is hovering and level.

14. The method as recited in claim 13, wherein step (c) further comprises controlling the operation of gimbal motors that drive tilting of respective rotor masts of the respective rotors relative to a frame of the unmanned aerial vehicle.

15. The method as recited in claim 13, wherein step (c) further comprises:
controlling the operation of a first set of gimbal motors that drive rotation of respective gimbal rings relative to respective deflector rings attached to a frame of the unmanned aerial vehicle; and
controlling the operation of a second set of gimbal motors that drive rotation of respective rotors relative to the respective gimbal rings.

16. A method for performing a maintenance operation on an airfoil-shaped body using an unmanned aerial vehicle, the method comprising:
(a) equipping the unmanned aerial vehicle with a maintenance tool and a plurality of standoff contact elements, the plurality of standoff contact elements being arranged to simultaneously contact a surface of the airfoil-shaped body, and the maintenance tool being arranged to confront an area on the surface of the airfoil-shaped body while the plurality of standoff contact elements are in contact with the surface;
(b) flying the unmanned aerial vehicle to a first location whereat the plurality of standoff contact elements of the unmanned aerial vehicle contact respective areas on a surface of an airfoil-shaped body;
(c) skimming the unmanned aerial vehicle along a path on the surface of the airfoil-shaped body along a path that extends from the first location to a second location; and
(d) while the plurality of standoff contact elements are in contact with the surface of the airfoil-shaped body, activating the maintenance tool to perform a maintenance operation on the surface of the airfoil-shaped body.

17. The method as recited in claim 16, wherein one of the first and second locations is adjacent to a side surface of the airfoil-shaped body and the other of the first and second locations is adjacent to a leading edge of the airfoil-shaped body.

18. The method as recited in claim 16, wherein the maintenance tool is a sensor array, step (c) comprises moving the sensor array along a scan path that follows the surface of the airfoil-shaped body, and step (d) comprises activating the sensor array to acquire nondestructive inspection sensor data representing characteristics of the airfoil-shaped body during movement of the sensor array along the scan path.

19. The method as recited in claim 16, wherein the maintenance tool is a nondestructive inspection sensor unit, step (c) comprises moving the nondestructive inspection sensor unit along a scan path that follows the surface of the structure, and step (d) comprises activating the nondestructive inspection sensor unit to acquire nondestructive inspection sensor data representing characteristics of the structure during movement of the nondestructive inspection sensor unit along the scan path.

20. The method as recited in claim 16, wherein the airfoil-shaped body is a wind turbine blade.

21. The method as recited in claim 16, wherein the airfoil-shaped body is part of an aircraft.

* * * * *